(12) United States Patent
Inoue

(10) Patent No.: US 10,560,592 B2
(45) Date of Patent: Feb. 11, 2020

(54) OPERATION SWITCH PRESS ERRONEOUS-DETECTION AVOIDANCE DEVICE, OPERATION SWITCH PRESS ERRONEOUS-DETECTION AVOIDANCE METHOD, PROGRAM FOR AVOIDING OPERATION SWITCH PRESS ERRONEOUS-DETECTION, OPERATION PANEL, AND MULTIFUNCTIONAL MACHINE

(71) Applicant: SHARP KABUSHIKI KAISHA, Sakai, Osaka (JP)

(72) Inventor: Yasuhiro Inoue, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/148,778

(22) Filed: Oct. 1, 2018

(65) Prior Publication Data

US 2019/0104225 A1 Apr. 4, 2019

(30) Foreign Application Priority Data

Oct. 3, 2017 (JP) ................................. 2017-193221

(51) Int. Cl.
*G06K 15/00* (2006.01)
*G06F 3/12* (2006.01)
*H04N 1/00* (2006.01)

(52) U.S. Cl.
CPC ..... *H04N 1/00397* (2013.01); *H04N 1/00307* (2013.01); *H04N 2201/006* (2013.01); *H04N 2201/0094* (2013.01)

(58) Field of Classification Search
None
See application file for complete search history.

(56) References Cited

FOREIGN PATENT DOCUMENTS

JP 2016-074164 A 5/2016

OTHER PUBLICATIONS

Utsumi Yuichi, Image Forming Device and Control Method for the Same as Well as Program, Dec. 5, 2016, JP 2016074164 (A), Machine Translated Patent Application Publication, pp. 1-11 (Year: 2016).*

* cited by examiner

*Primary Examiner* — Dov Popovici
(74) *Attorney, Agent, or Firm* — ScienBiziP, P.C.

(57) ABSTRACT

An operation switch press erroneous-detection avoidance device, if an operation on an operation switch is performed by an approaching object to the operation switch, in a case where the operation on the operation switch is detected during a period when an event which occurs in association with the operation on the operation switch occurs, prohibits a process associated with the operation switch from being activated.

10 Claims, 25 Drawing Sheets

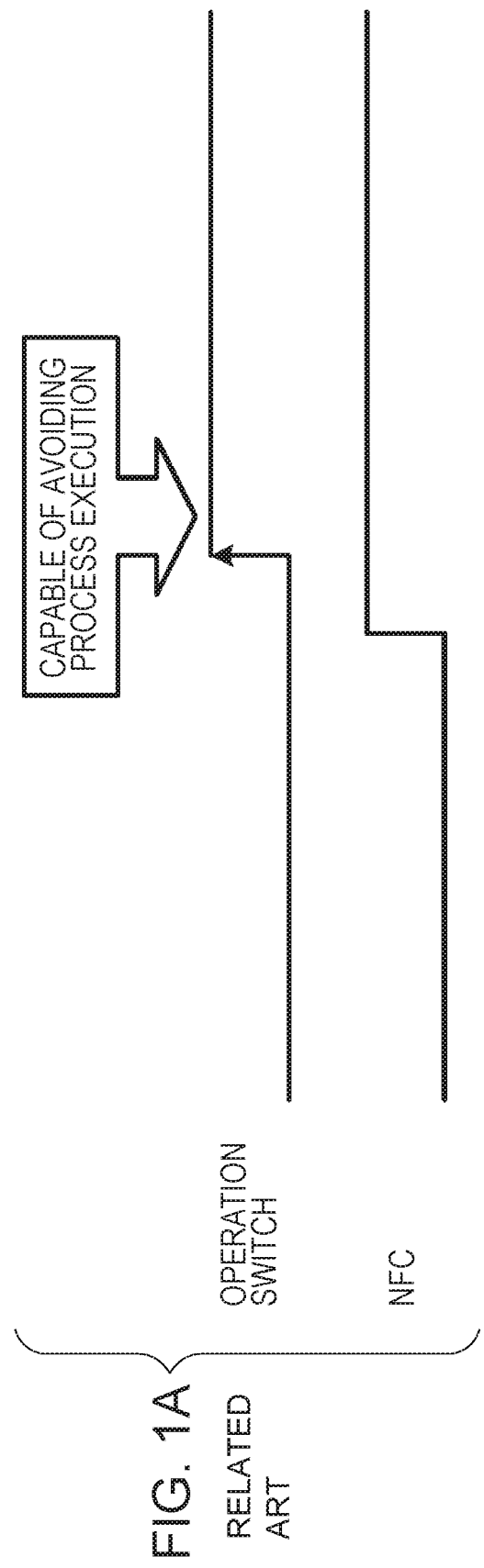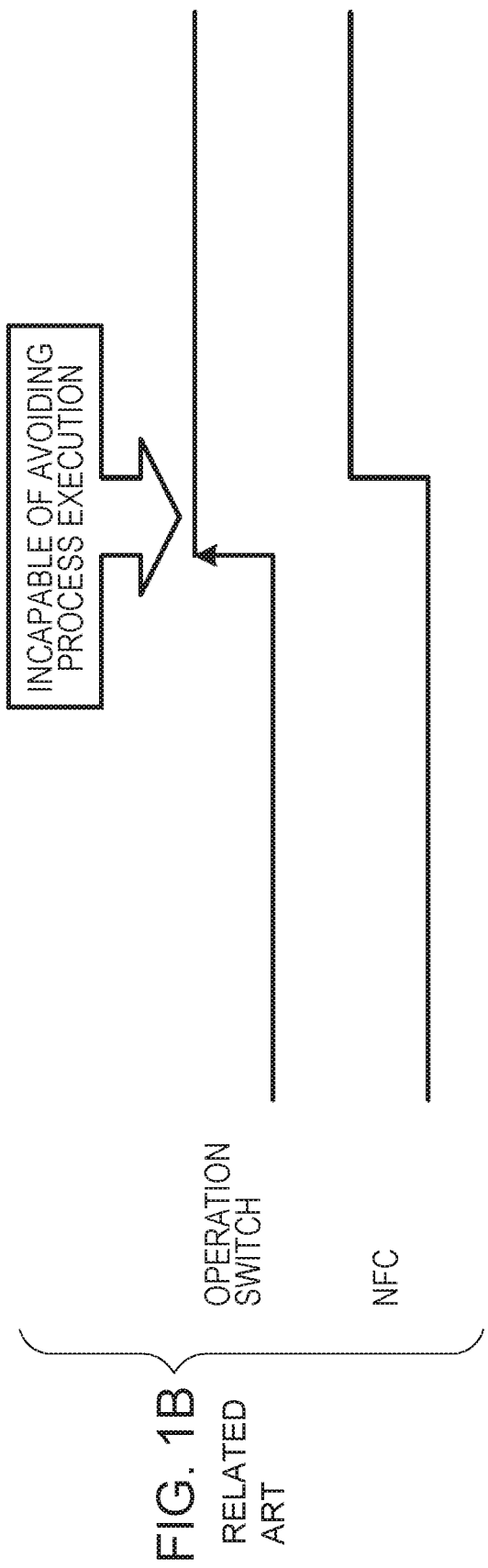

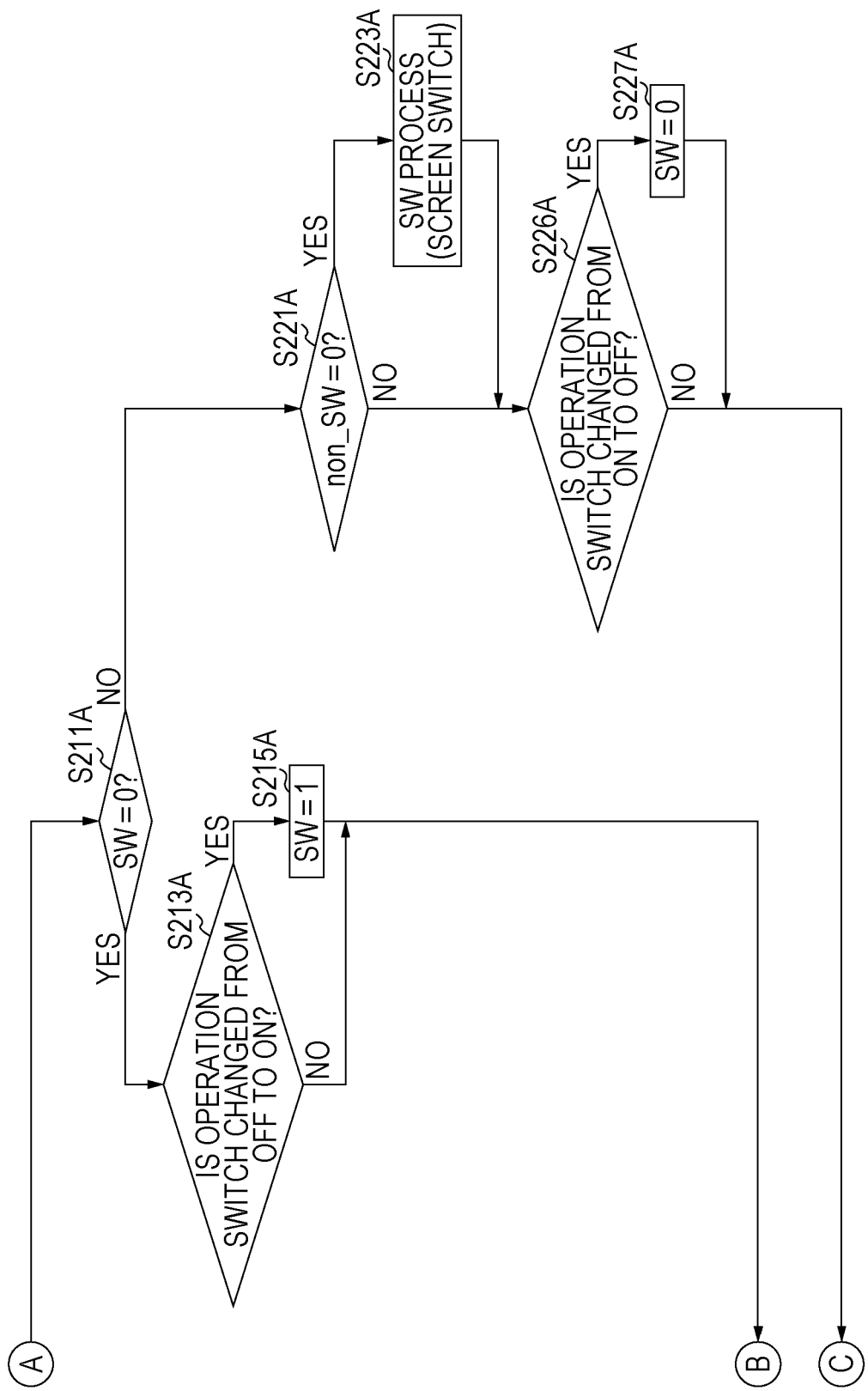

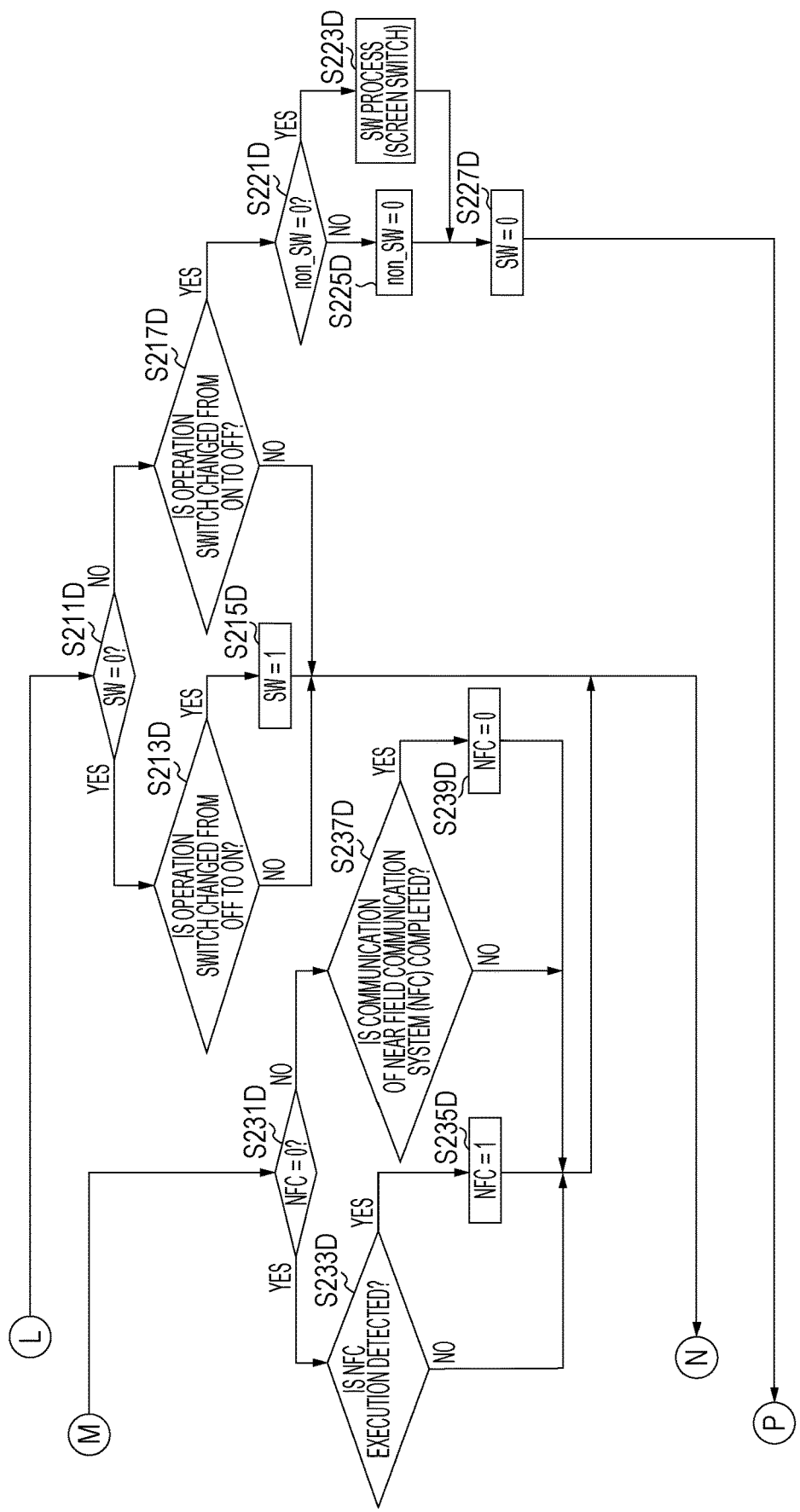

OPERATION SWITCH PRESS ERRONEOUS-DETECTION AVOIDANCE DEVICE, OPERATION SWITCH PRESS ERRONEOUS-DETECTION AVOIDANCE METHOD, PROGRAM FOR AVOIDING OPERATION SWITCH PRESS ERRONEOUS-DETECTION, OPERATION PANEL, AND MULTIFUNCTIONAL MACHINE

BACKGROUND

1. Field

The present disclosure relates to an operation switch press erroneous-detection avoidance device, an operation switch press erroneous-detection avoidance method, a program for avoiding operation switch press erroneous-detection, and an operation panel and a multifunctional machine including the operation switch press erroneous-detection avoidance device.

2. Description of the Related Art

In some cases, a multifunctional machine by adding a network connection function, a facsimile function, a data communication function, a data input/output function, a data storage function, and the like to an image copying apparatus including an image forming apparatus and an image reading apparatus, includes an operation panel unit having an NFC reader/writer for performing near field communication (NFC) with an NFC mobile terminal in addition to operation buttons. Here, the NFC reader/writer includes an NFC antenna and an NFC controller.

Meanwhile, in the operation panel unit, for example, when a capacitive operation button and the NFC antenna of the NFC reader/writer are close to each other, the mobile terminal such as a smartphone placed for performing the NFC with the NFC reader/writer also covers a vicinity of a switch. In a case where a capacitance detection switch is used as the switch, when the mobile terminal as a conductor covers an upper surface of the switch, capacitance changes and the surface of the switch is charged, so that the switch has performance to react. That is, when the mobile terminal which functions as a conductor approaches the capacitance detection switch, the capacitance detection switch reacts to the mobile terminal. In addition, an optical switch reacts when a mobile terminal conductor which functions as a shield approaches the optical switch. Further, a mechanical switch reacts when the mobile terminal pushes the switch.

It is assumed that the mobile terminal for performing the NFC with the multifunctional machine is placed on the operation panel unit and a capacitive type, optical type, or mechanical type operation switch which is the operation panel unit is pressed by the mobile terminal. FIG. 1A is a diagram illustrating a normal method for prohibiting a process associated with the operation switch from being activated in this case. The normal method uses that if a state of the operation switch is changed from an unpressed state to a pressed state while the NFC is executing, it is possible to determine that the change is not caused by the operation switch being pressed by a user but caused by the operation switch being apparently pressed by the mobile terminal.

However, as illustrated in FIG. 1B, in some cases, the NFC is started between the multifunctional machine and the mobile terminal as the state of the operation switch is changed from the unpressed state to the pressed state by the mobile terminal. In this case, it is not possible to prohibit the process associated with the operation switch from being activated.

Japanese Unexamined Patent Application Publication No. 2016-74164 disclosures an operation control unit which beforehand detects a magnetic field output from a mobile terminal such as a smartphone and invalidates an operation corresponding to activation of a printing process of a key disposed in an operation unit so that a frequency of occurrence of erroneous operations in an operation unit by a user is reduced. In a case where the magnetic field may be not beforehand detected, Japanese Unexamined Patent Application Publication No. 2016-74164 disclosures a method of canceling an immediately previous switch input in a case where the magnetic field is detected during a predetermined period after the switch is input.

However, in the method of Japanese Unexamined Patent Application Publication No. 2016-74164, the input determination of the switch is delayed also in a case of normal use. In addition, in a case where a desired switch operation and a desired NFC operation are continuously and quickly performed, in some cases, the desired switch operation may be canceled.

Further, in a case where power is not supplied to an antenna coil on a side of the mobile terminal (for example, in a case where NFC is terminated and antenna power is turned off), malfunction may not be avoided.

SUMMARY

It is desirable to provide an operation switch press erroneous-detection avoidance device, an operation switch press erroneous-detection avoidance method, a program for avoiding operation switch press erroneous-detection, and an operation panel unit and a multifunctional machine including the operation switch press erroneous-detection avoidance device which, in a case where an operation switch is apparently pressed by an object other than an operation by a user, certainly avoid an erroneous detection that the operation is performed by the user and do not interfere with operability of a normal operation switch by the user.

According to an aspect of the disclosure, there is provided an operation switch press erroneous-detection avoidance device that, if an operation on an operation switch is performed by an approaching object to the operation switch, in a case where the operation on the operation switch is detected during a period when an event which occurs in association with the operation on the operation switch occurs, prohibits a process associated with the operation switch from being activated.

According to another aspect of the disclosure, there is provided a multifunctional machine that includes the operation switch press erroneous-detection avoidance device.

According to still another aspect of the disclosure, there is provided an operation switch press erroneous-detection avoidance method including, if an operation on an operation switch is performed by an approaching object to the operation switch, in a case where the operation on the operation switch is detected during a period when an event which occurs in association with the operation on the operation switch occurs, prohibiting a process associated with the operation switch from being activated.

According to still another aspect of the disclosure, there is provided a non-transitory computer readable medium storing an operation switch press erroneous-detection avoidance program causing a computer to function as the operation switch press erroneous-detection avoidance device.

BRIEF DESCRIPTION OF THE DRAWINGS

FIGS. 1A and 1B are diagrams of first and second timings for explaining an operation switch press erroneous-detection avoidance method in the related art;

FIG. 18B is a flowchart (2/2) for explaining the operation switch press erroneous-detection avoidance method according to Example 1 of the present disclosure;

FIG. 21B is a flowchart (2/2) for explaining the operation switch press erroneous-detection avoidance method according to Example 4 of the present disclosure.

DESCRIPTION OF THE EMBODIMENTS

Hereinafter, embodiments of the present disclosure will be described in detail with reference to the accompanying drawings.

Figure 2A:
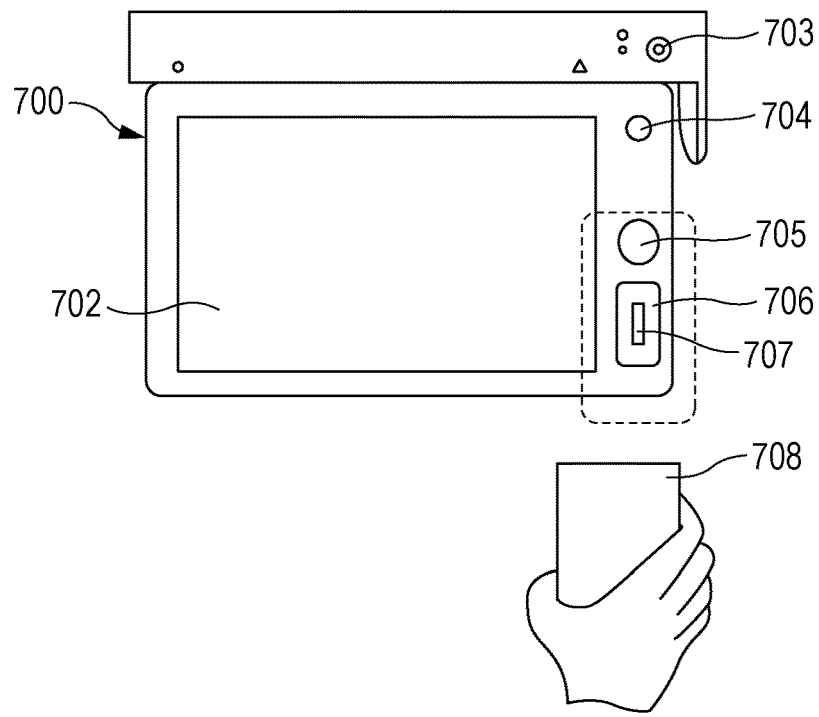
FIG. 2A is a front view illustrating an appearance of an example of an operation panel unit according to an embodiment of the present disclosure.
Figure 3:
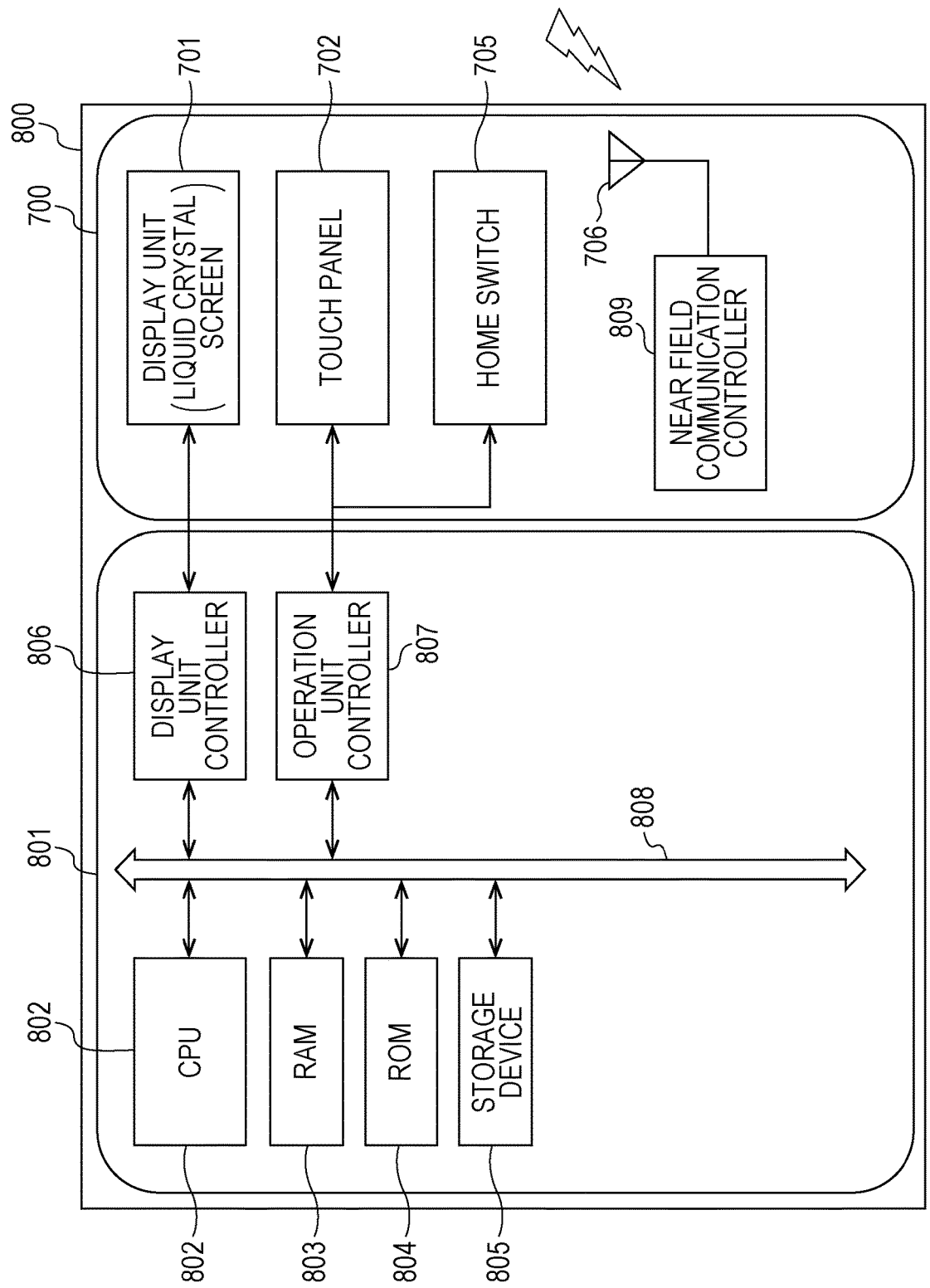
FIG. 3 is a functional block diagram illustrating a configuration of the operation panel unit or the like according to the embodiment of the present disclosure.

FIGS. 2A and 3 are diagrams illustrating an example of an operation panel unit according to the present embodiment. An operation panel unit 700 includes a display unit (liquid crystal screen) 701, a touch panel 702, a power key 703, a power saving switch 704, a home switch 705, an NFC antenna 706, a detecting switch 707, and a near field communication (NFC) controller 809.

The operation panel unit 700 is a unit which performs a process related to an overall operation of a multifunctional machine. The display unit (liquid crystal screen) 701 is a device for displaying desired information. The touch panel 702 is a device of which at least a part is overlapped with the display unit 701 and which detects a position pressed by a user's finger or the like by a mechanical contact point or a capacitance change and transmits two-dimensional coordinates of the position to the multifunctional machine. The power key 703 is a key for switching between power-on and power-off in the multifunctional machine and includes a mechanical contact point. The power saving switch 704 is a capacitive switch for causing the multifunctional machine to move to a power saving mode. The home switch 705 is a capacitive switch for causing the display unit 701 to display a home screen. The NFC antenna 706 is a loop coil antenna for performing NFC. The detecting switch 707 is a capacitive switch for detecting that a mobile terminal approaches a top of the NFC antenna 706 and is disposed inside the loop-shaped NFC antenna 706 in FIG. 2A. This configuration is appropriate, but the detecting switch 707 may have another configuration. The near field communication (NFC) controller 809 performs a communication process with the mobile terminal such as a smartphone connected via the NFC antenna 706 and is a device capable of communicating with a CPU 802.

With further reference to FIG. 3, a multifunctional machine 800 includes the operation panel unit 700 described above and a controller unit 801. The controller unit 801 includes a central processing unit (CPU) 802, a random access memory (RAM) 803, a read only memory (ROM) 804, a storage device 805, a display unit controller 806, an operation unit controller 807, and a bus 808 connected with the central processing unit (CPU) 802, the random access memory (RAM) 803, the read only memory (ROM) 804, the storage device 805, the display unit controller 806, and the operation unit controller 807.

The central processing unit (CPU) 802 transmits a program stored in the read only memory (ROM) 804 to the random access memory (RAM) 803 and reads and executes the program to control each of units or realize a function of each of the units of the multifunctional machine 800.

The storage device 805 is, for example, a hard disk drive and stores image data input from an image input device included in the multifunctional machine, a network, a mobile terminal, a memory card, or the like connected to the multifunctional machine.

The display unit controller 806 is a controller for causing the display unit 701 to display a screen. The operation unit controller 807 is a controller for recognizing an input to the touch panel 702 and a key such as the power key 703, the power saving switch 704, or the home switch 705.

With reference to FIG. 2A, the user brings the mobile terminal 708 close to the NFC antenna 706 so as to cover the NFC antenna 706 so that a mobile terminal 708 performs NFC with the NFC reader/writer. If the mobile terminal 708 covers an area indicated by a dashed rectangle in FIG. 2A, the mobile terminal 708 approaches the home switch 705 inside the area. In this case, there is a possibility that the home switch 705 erroneously recognizes the approaching mobile terminal 708 as an operation by the user. The present embodiment may avoid the erroneous recognition.

In the following description, a case where a state of the operation switch is changed from an unpressed state to a pressed state by the operation switch such as the home switch 705 or the power saving switch 704 being pressed, is referred to as "switch-down". A case where the state of the operation switch is changed from the pressed state to the unpressed state by the pressed operation switch being released, is referred to as "switch-up". In addition, a state in which the operation switch is pressed, is referred to as "switch-press".

Further, a case where the state of the operation switch is changed from the unpressed state to the pressed state by the detecting switch 707 being pressed, is referred to as "switch-down". A case where the state of the detecting switch 707 is changed from the pressed state to the unpressed state by the pressed detecting switch 707 being released, is referred to as "switch-up". In addition, a state in which the detecting switch 707 is pressed, is referred to as "switch-press".

The switch-down, the switch-up, or the switch-press also occurs by bringing the mobile terminal close to these switches.

First Embodiment

A first embodiment basically has a configuration in which a process related to the operation switch is activated by the switch-down according to the operation switch being pressed.

In a case where the mobile terminal approaches not only the NFC antenna 706 but also the operation switch such as the home switch 705 or the power saving switch 704 disposed near the NFC antenna 706 so as to perform the NFC, the operation switch is apparently pressed by the mobile terminal. Without any measures, the process related to the operation switch is activated by the operation switch being apparently pressed.

The present embodiment uses that in the case where the mobile terminal approaches the operation switch so as to perform the NFC, the detecting switch 707 disposed in the vicinity of the operation switch is apparently pressed by the mobile terminal.

Specifically, if the detecting switch disposed near the operation switch is apparently pressed by the mobile terminal and the detecting switch is at the switch-press state, during this period, the case where the process related to the operation switch is activated by the switch-down according to the operation switch being apparently pressed, is avoided.

Figure 4:
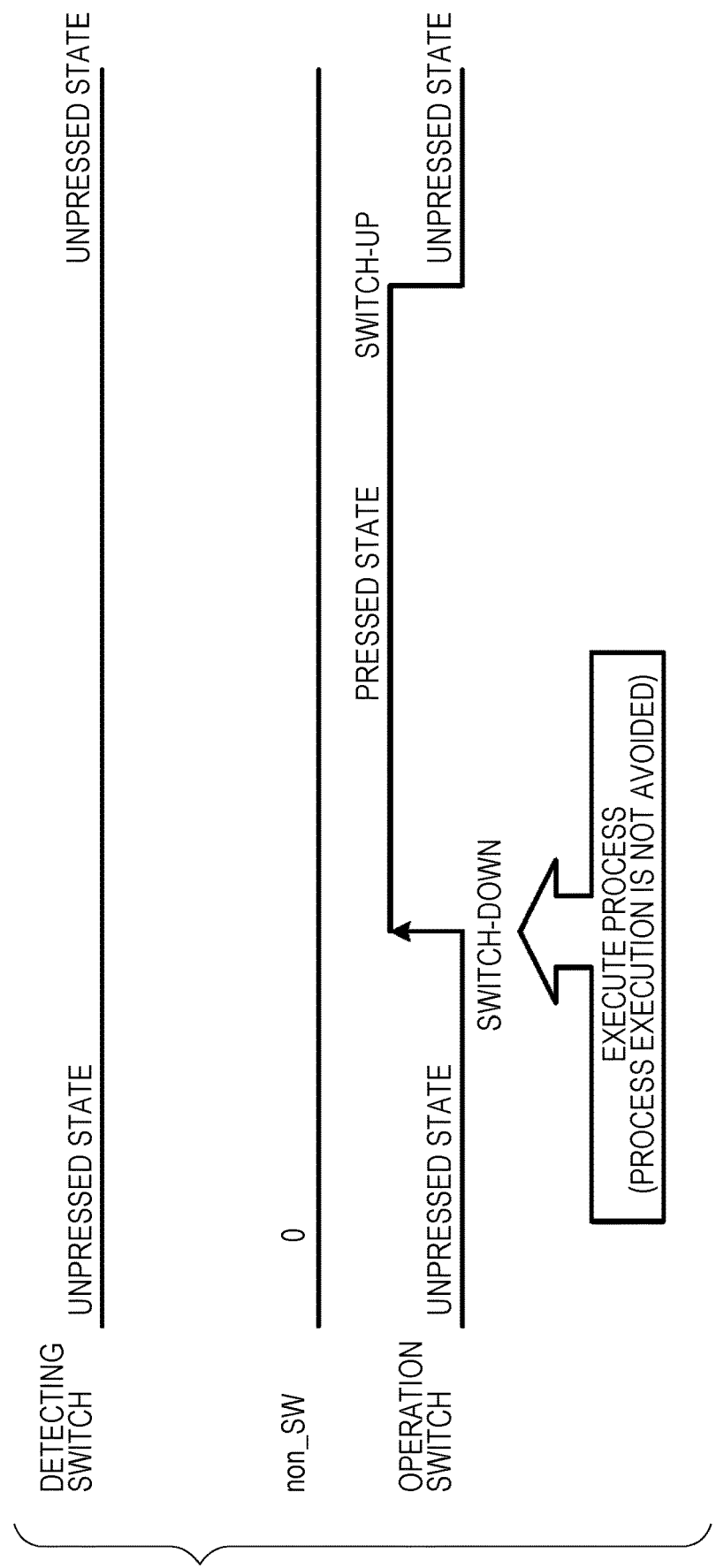
FIG. 4 is a diagram of a first timing for explaining an operation switch press erroneous-detection avoidance method according to a first embodiment of the present disclosure.
Figure 5:
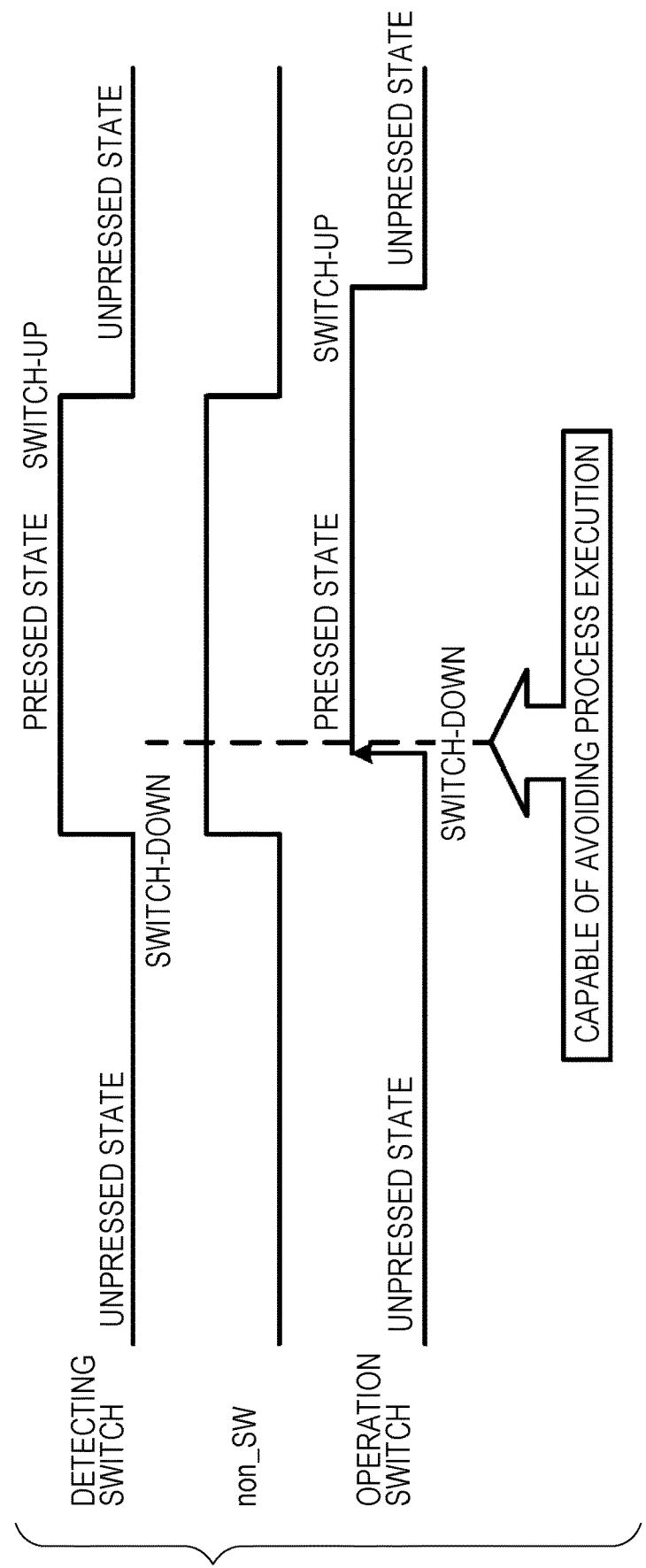
FIG. 5 is a diagram of a second timing for explaining the operation switch press erroneous-detection avoidance method according to the first embodiment of the present disclosure.
Figure 6:
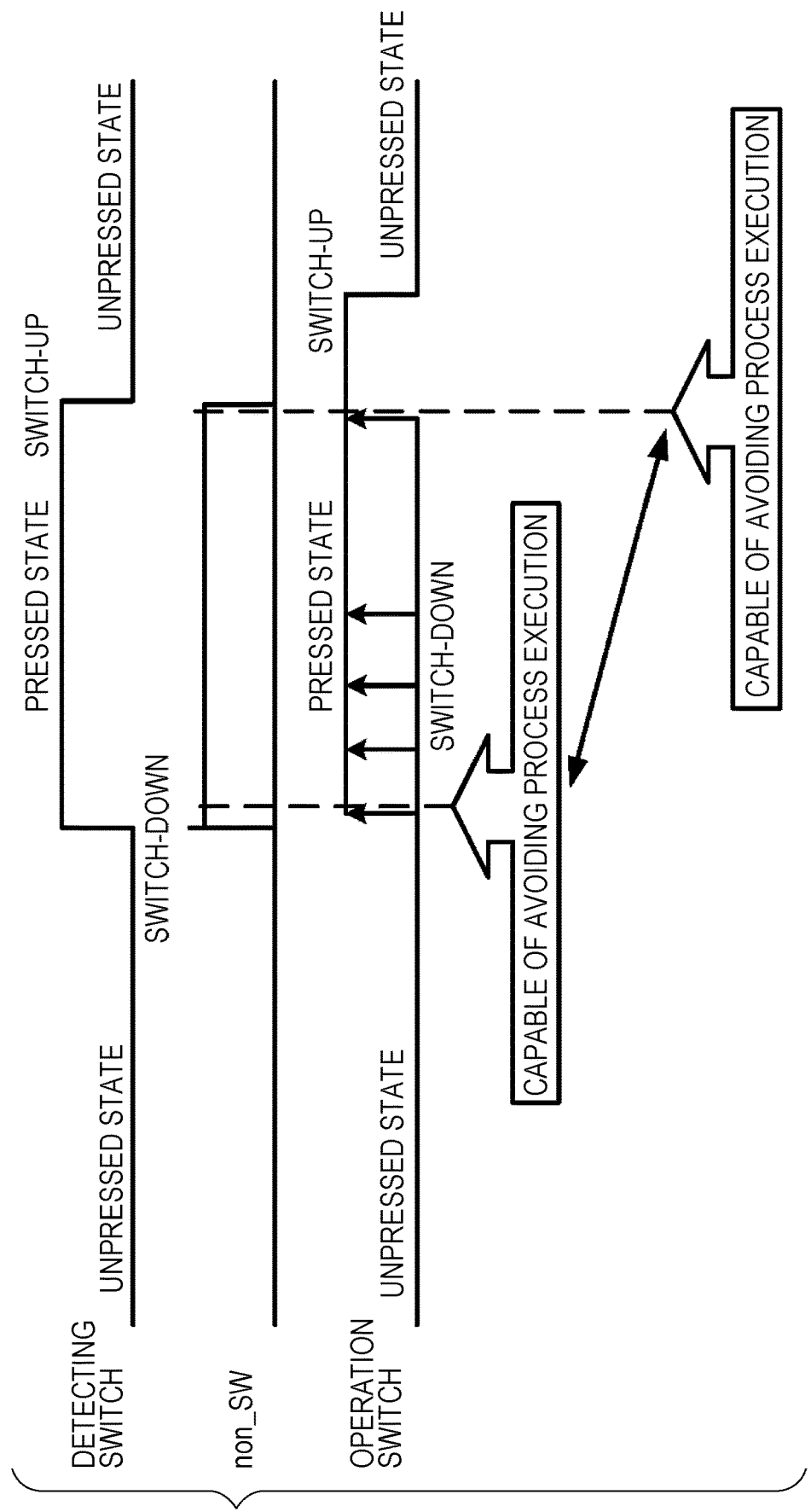
FIG. 6 is a diagram of a third timing for explaining the operation switch press erroneous-detection avoidance method according to the first embodiment of the present disclosure.

FIGS. 4, 5, and 6 are diagrams of timings in a case where an operation switch press erroneous-detection avoidance method according to the first embodiment is executed.

FIG. 4 illustrates a case where the user's finger or the like presses the operation switch. Since the detecting switch is not pressed before the switch-down occurs according to the operation switch being pressed, it is determined that the switch-down occurs by the operation switch being pressed by the user's finger or the like and the process associated with the operation switch is activated.

FIG. 5 illustrates a case where the mobile terminal for performing the NFC presses the operation switch. During the period when the detecting switch is pressed, in a case where the switch-down is detected by the operation switch being pressed, it is determined that the switch-down occurs by the operation switch being apparently pressed by the mobile terminal. According to this determination, a prohibition flag non_SW is set. Since the prohibition flag non_SW is set even if it is once more detected that the detecting switch is pressed during the next program execution cycle, the process associated with the operation switch is not activated.

FIG. 6 illustrates that even if the switch-down occurs by the operation switch being pressed while the detecting switch is pressed, it is possible to avoid the process associated with the operation switch from being activated.

Second Embodiment

A second embodiment basically has a configuration in which the process related to the operation switch is activated by the switch-up according to the operation switch being pressed.

In a case where the mobile terminal approaches not only the NFC antenna 706 but also the operation switch such as the home switch 705 or the power saving switch 704 disposed near the NFC antenna 706 so as to perform the NFC, the operation switch is apparently pressed by the mobile terminal. Without any measures, the process related to the operation switch is activated by lifting the mobile terminal.

The present embodiment uses that in the case where the mobile terminal approaches the operation switch so as to perform the NFC, the detecting switch 707 disposed in the vicinity of the operation switch is apparently pressed by the mobile terminal.

Specifically, if the detecting switch disposed near the operation switch is apparently pressed by the mobile terminal and the detecting switch is at the switch-press state, during this period, the case where the process related to the operation switch is activated by the switch-up according to the operation switch being apparently pressed, is avoided.

Figure 7:
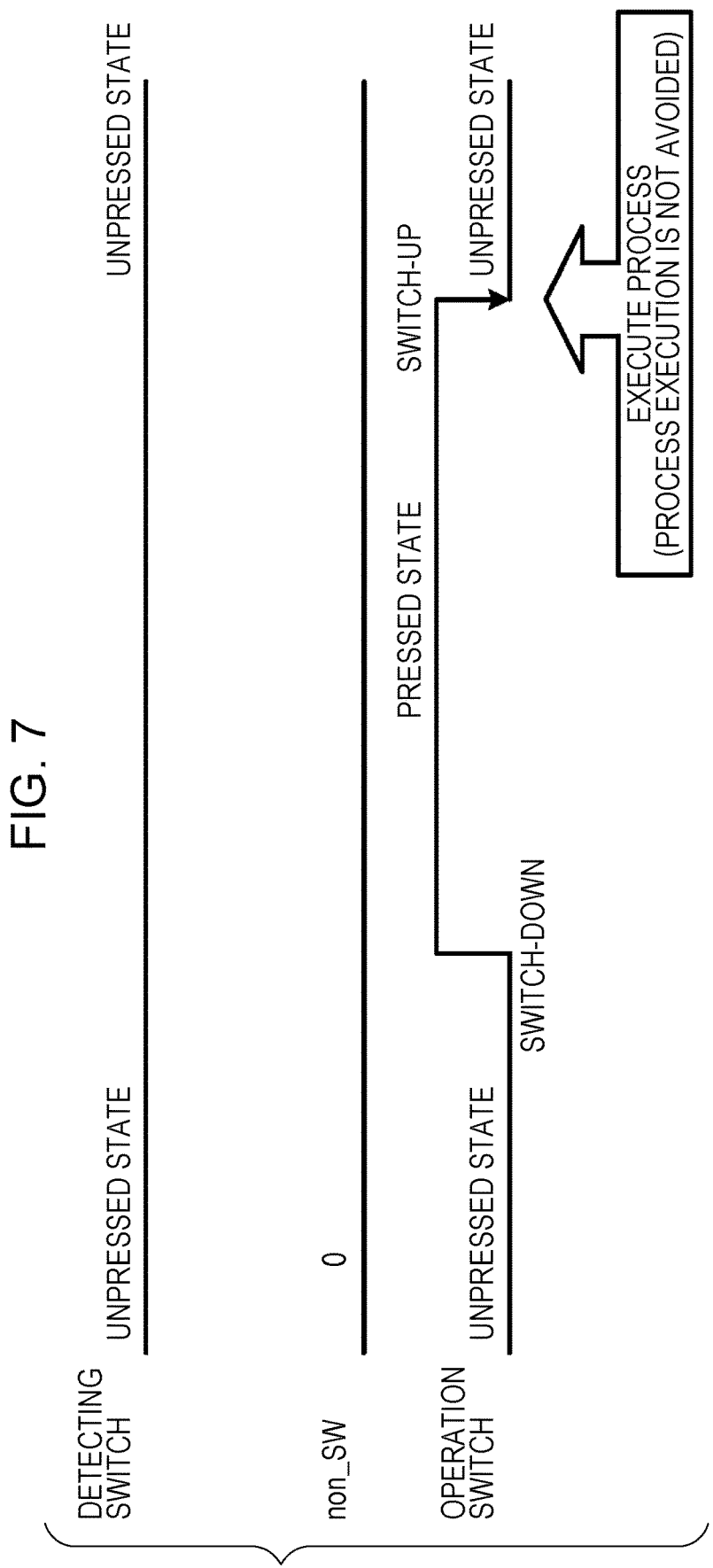
FIG. 7 is a diagram of a first timing for explaining an operation switch press erroneous-detection avoidance method according to a second embodiment of the present disclosure.
Figure 8:
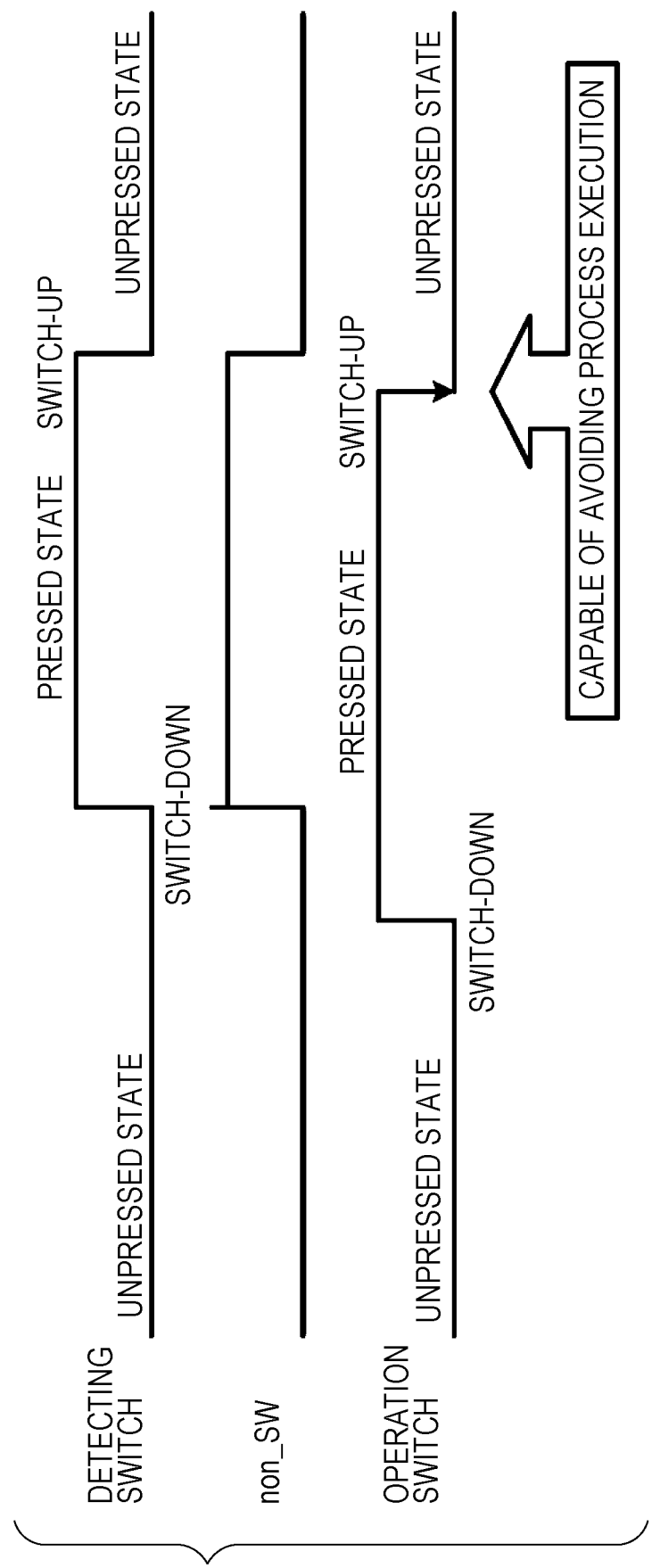
FIG. 8 is a diagram of a second timing for explaining the operation switch press erroneous-detection avoidance method according to the second embodiment of the present disclosure.
Figure 9:
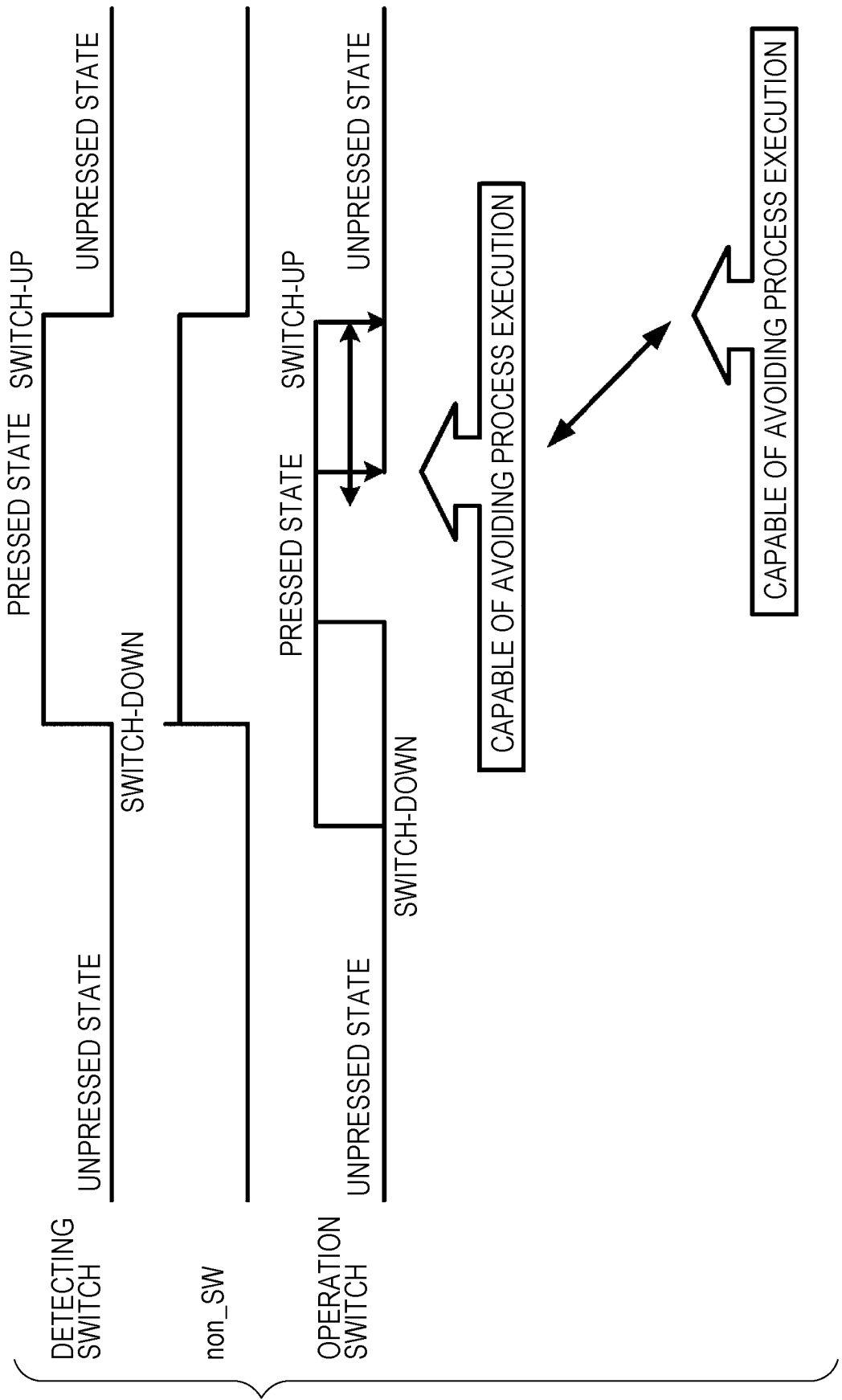
FIG. 9 is a diagram of a third timing for explaining the operation switch press erroneous-detection avoidance method according to the second embodiment of the present disclosure.

FIGS. 7, 8, and 9 are diagrams of timings in a case where an operation switch press erroneous-detection avoidance method according to the second embodiment is executed.

FIG. 7 illustrates a case where the user's finger or the like presses the operation switch. Since the detecting switch is not pressed before the switch-up occurs according to the operation switch being pressed, it is determined that the switch-up occurs by the operation switch being pressed by the user's finger or the like and the process associated with the operation switch is activated.

FIG. 8 illustrates a case where the mobile terminal for performing the NFC presses the operation switch. Since the prohibition flag non_SW is set by the detecting switch being pressed before the switch-up occurs according to the operation switch being pressed, it is determined that the switch-up occurs by the operation switch being apparently pressed by the mobile terminal and it is possible to avoid the process associated with the operation switch from being activated.

FIG. 9 illustrates that in a case of the switch-down state by the press of the detecting switch, even when the switch-up occurs by the operation switch being pressed, it is possible to avoid the process associated with the operation switch from being activated.

Although all of cases are not illustrated, even if the switch-up occurs according to the operation switch being pressed during a prescribed period when a period during which the detecting switch is pressed, it may be possible to avoid the process associated with the operation switch from being activated.

Third Embodiment

A third embodiment basically has a configuration in which the process related to the operation switch is activated by the switch-up which occurs after the operation switch is pressed.

In a case where the mobile terminal approaches not only the NFC antenna 706 but also the operation switch such as the home switch 705 or the power saving switch 704 disposed near the NFC antenna 706 so as to perform the NFC, the operation switch is apparently pressed by the mobile terminal. Without any measures, the process related to the operation switch is activated by taking and releasing the mobile terminal.

The present embodiment uses that in the case where the mobile terminal approaches the operation switch so as to perform the NFC, the detecting switch 707 disposed in the vicinity of the operation switch is apparently pressed by the mobile terminal and the NFC is executed.

Specifically, if both of a case where the detecting switch disposed near the operation switch is apparently pressed by the mobile terminal and whether the NFC is started at a previous time of the switch-down according to the press or the NFC is started within a predetermined period after the switch-down are detected, the case where the process related to the operation switch is activated by the switch-up according to the operation switch being pressed, is avoided. The NFC can be detected by a current induced in the NFC antenna 706 or a digital signal in a circuit for the NFC.

Figure 10:
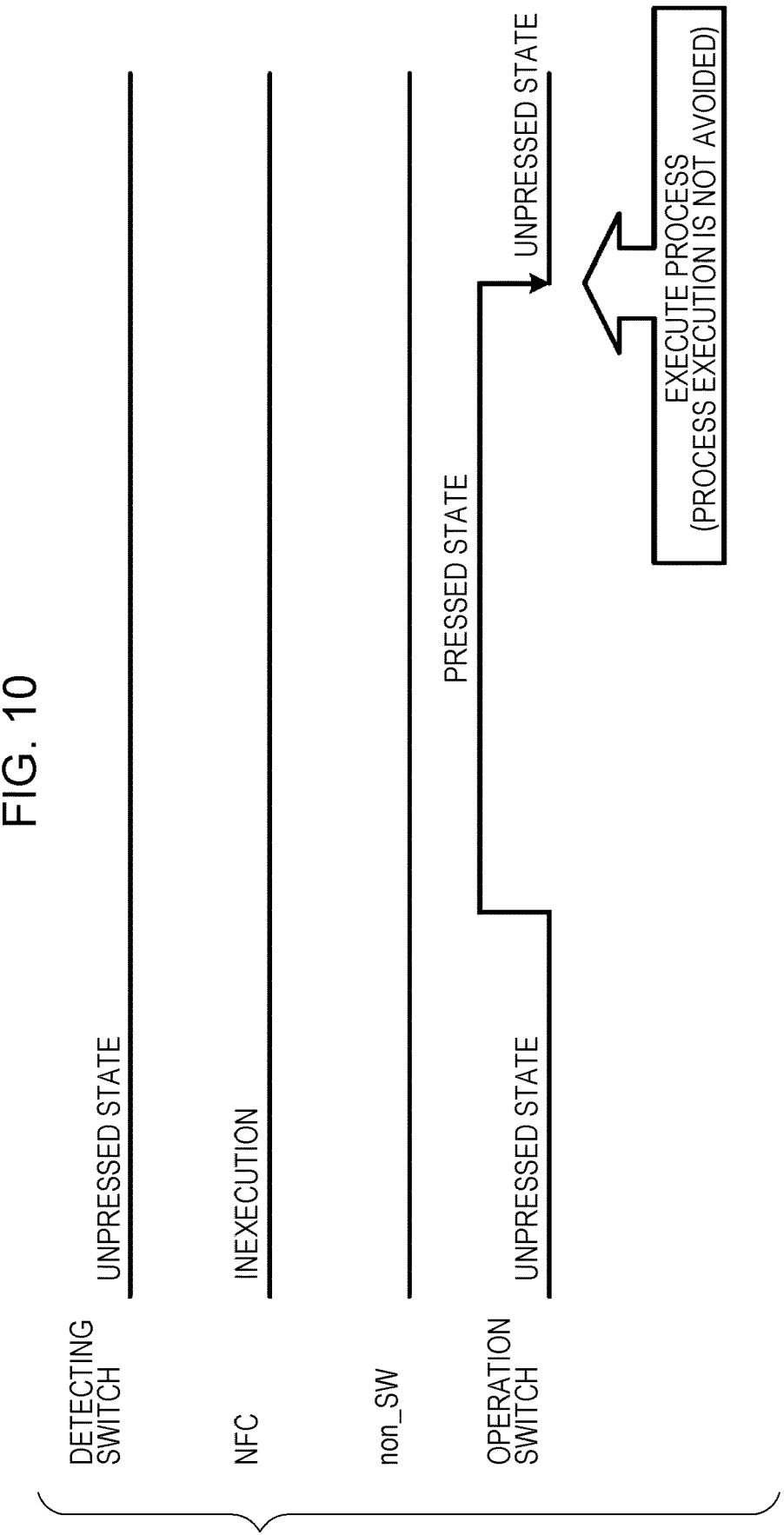
FIG. 10 is a diagram of a first timing for explaining an operation switch press erroneous-detection avoidance method according to a third embodiment of the present disclosure.
Figure 11:
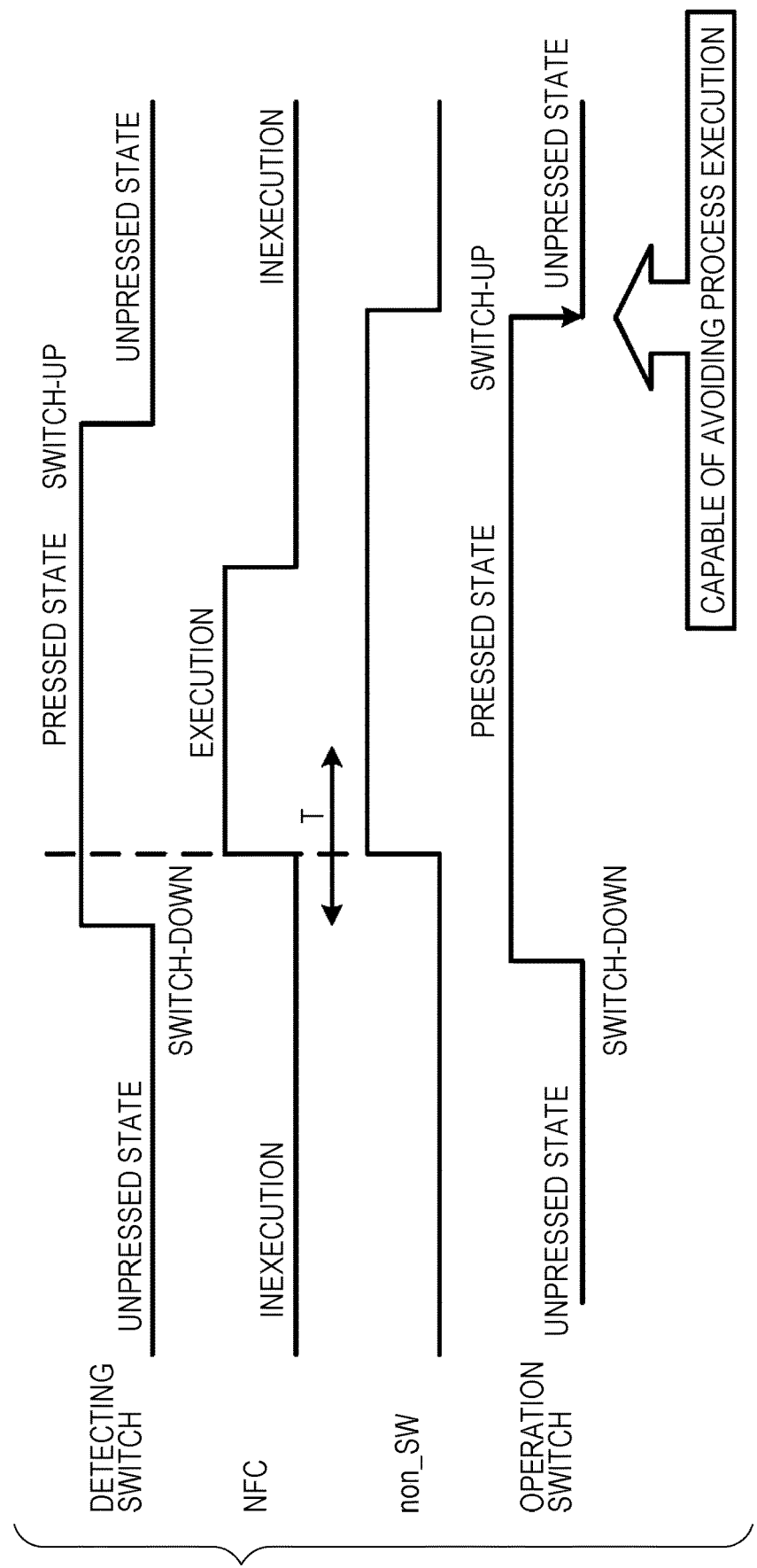
FIG. 11 is a diagram of a second timing for explaining the operation switch press erroneous-detection avoidance method according to the third embodiment of the present disclosure.
Figure 12:
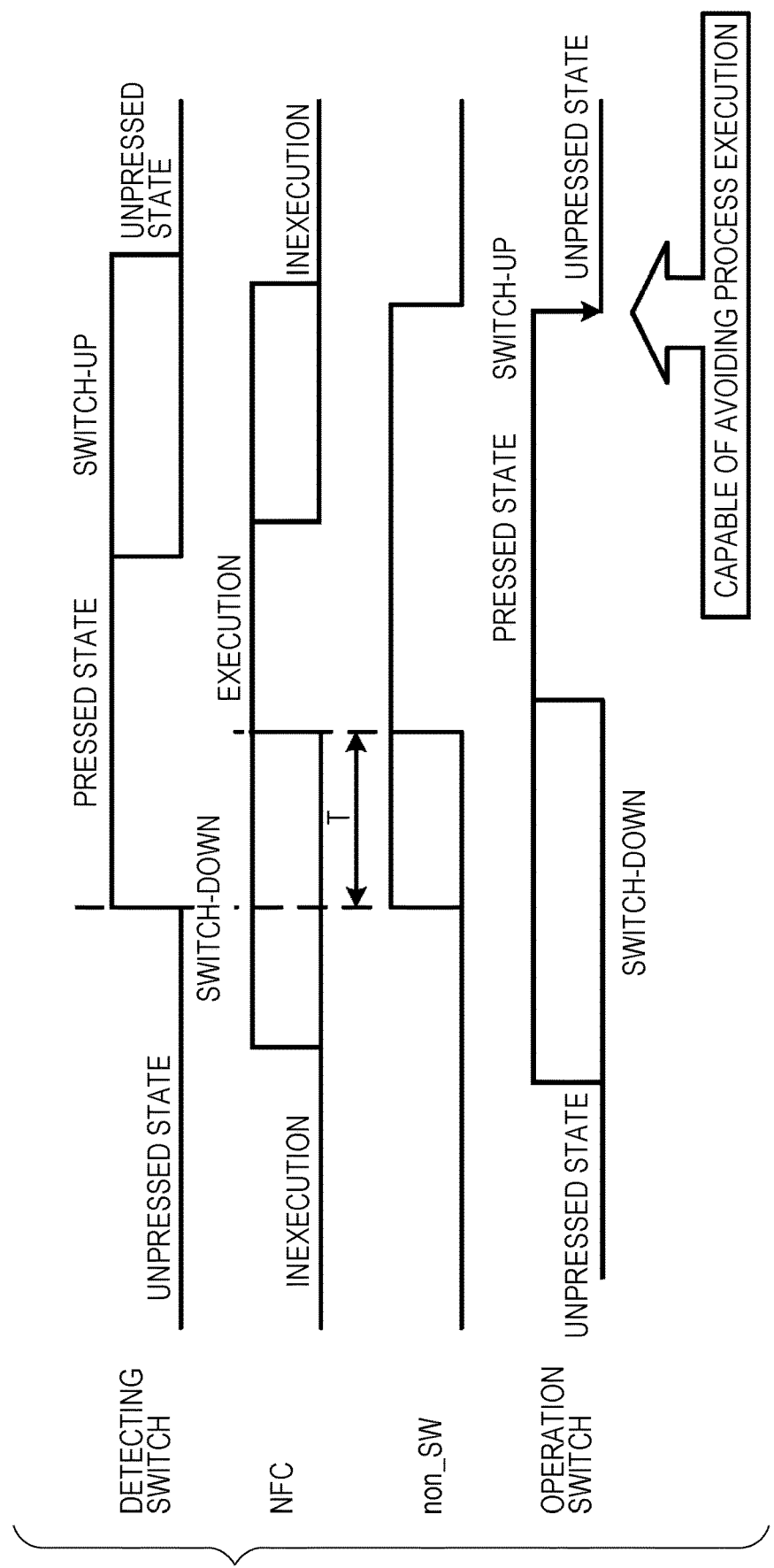
FIG. 12 is a diagram of a third timing for explaining the operation switch press erroneous-detection avoidance method according to the third embodiment of the present disclosure.

FIGS. 10, 11, and 12 are diagrams of timings in a case where an operation switch press erroneous-detection avoidance method according to the third embodiment is executed.

FIG. 10 illustrates a case where the user's finger or the like presses the operation switch. Since the detecting switch is not pressed before the switch-up occurs according to the operation switch being pressed and the NFC is not executed, it is determined that the switch-up occurs by the operation switch being pressed by the user's finger or the like and the process associated with the operation switch is activated.

FIG. 11 illustrates a case where the mobile terminal for performing the NFC apparently presses the operation switch and the NFC is executed. When it is detected that the NFC is executed after the switch-down according to the detecting switch disposed in the vicinity of the operation switch being pressed occurs until a prescribed period T elapses, the prohibition flag non_SW is set. When the switch-up according to the operation switch being pressed occurs at the state in which the prohibition flag non_SW is set, it is determined that the switch-up occurs by the operation switch being apparently pressed by the mobile terminal and it is possible to avoid the process associated with the operation switch from being activated.

In addition, when it is not detected that the NFC is executed after the switch-down according to the detecting switch disposed in the vicinity of the operation switch being pressed occurs until the prescribed period T elapses, the prohibition flag non_SW is not set. In this case, even if the NFC execution is detected after then, when the switch-up according to the operation switch being pressed occurs, it is determined that the switch-up occurs by the operation switch being pressed by the operation of the user and the process associated with the operation switch is activated.

As described above, FIG. 12 illustrates that if both of the case where the detecting switch disposed near the operation switch is apparently pressed by the mobile terminal and whether the NFC is started at the previous time of the switch-down according to the press or the NFC is started within a predetermined period after the switch-down is detected, the case where the process related to the operation switch is activated by the switch-up according to the operation switch being pressed, is avoided. In particular, there is a tolerance on a preceding period of the NFC start for the switch-down according to the detecting switch being pressed, a total period of the NFC, a period when the detecting switch is pressed, a timing of the switch-down according to the operation switch being pressed, or a timing of the switch-up according to the operation switch being pressed. A prescribed limit may be set for the tolerance. In addition, the prescribed period T described above can be adjusted.

Further, a signal related to the detecting switch being pressed and a signal related to the NFC detection may be exchanged. In this case, a signal of the detecting switch and a signal of the NFC detection in FIG. 12 are exchanged.

Fourth Embodiment

A fourth embodiment basically has a configuration in which the process related to the operation switch is activated by the switch-up which occurs after the operation switch is pressed.

In a case where the mobile terminal approaches not only the NFC antenna 706 but also the operation switch such as the home switch 705 or the power saving switch 704 disposed near the NFC antenna 706 so as to perform the NFC, the operation switch is apparently pressed by the mobile terminal. Without any measures, the process related to the operation switch is activated by the operation switch being apparently pressed.

The present embodiment uses that in the case where the mobile terminal approaches the operation switch so as to perform the NFC, the detecting switch 707 disposed in the vicinity of the operation switch is apparently pressed by the mobile terminal and the NFC is executed.

Specifically, if both of a case where the detecting switch disposed near the operation switch is apparently pressed by the mobile terminal and whether the NFC is started at a previous time of the switch-down according to the press, the NFC is started during the press, or the NFC is started within a predetermined period after the switch-up by the press are detected, the case where the process related to the operation switch is activated by the switch-up according to the operation switch being pressed, is avoided.

Figure 13:
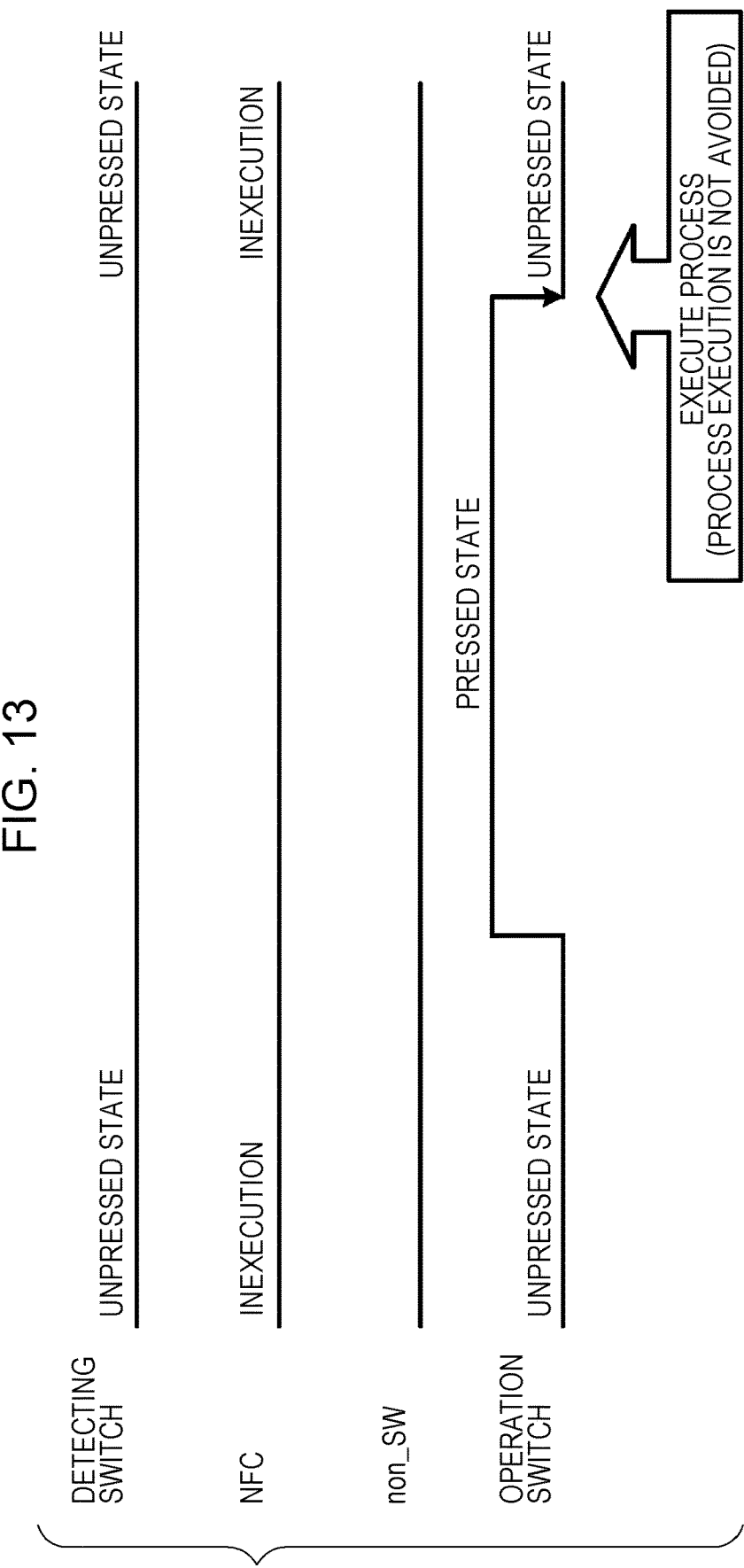
FIG. 13 is a diagram of a first timing for explaining an operation switch press erroneous-detection avoidance method according to a fourth embodiment of the present disclosure.
Figure 14:
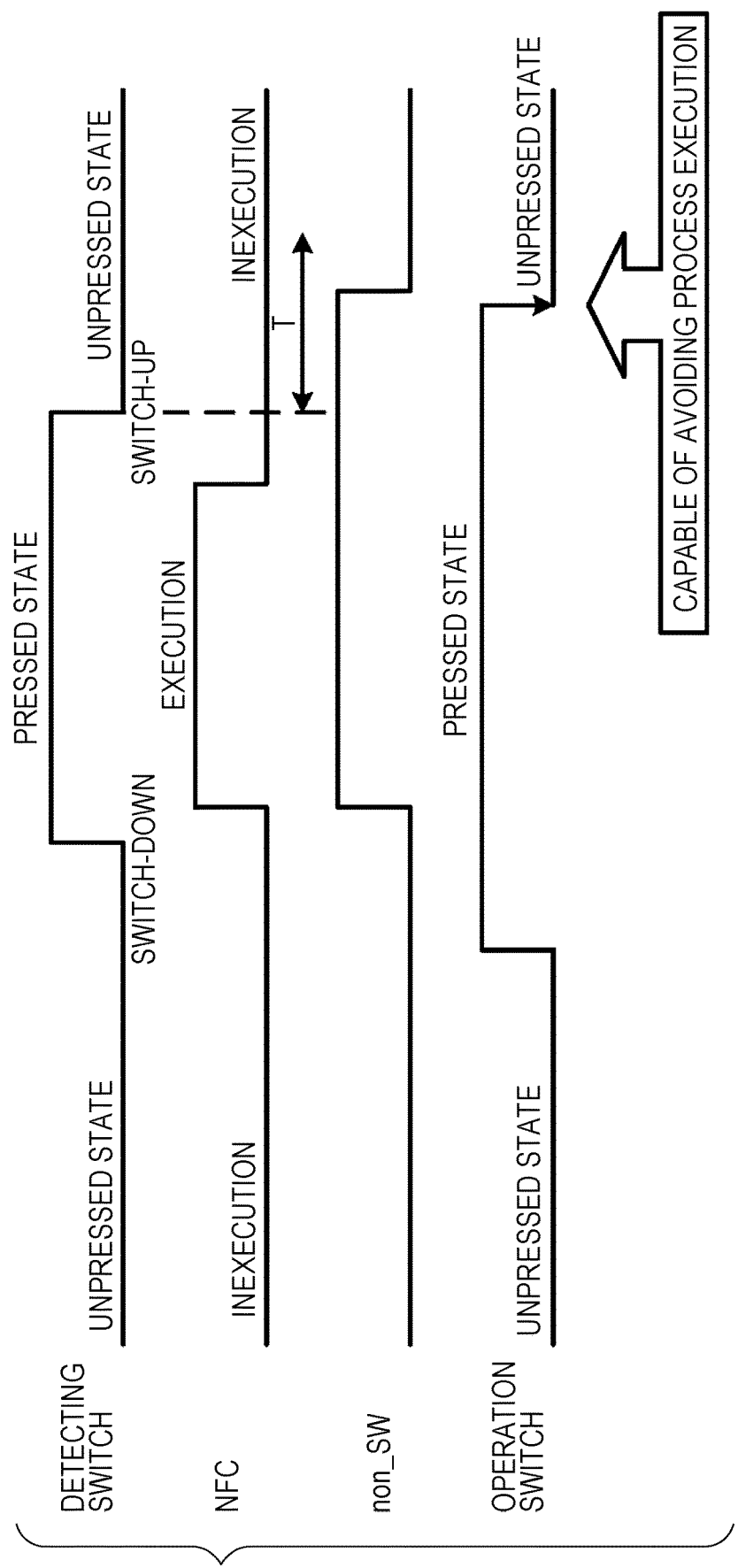
FIG. 14 is a diagram of a second timing for explaining the operation switch press erroneous-detection avoidance method according to the fourth embodiment of the present disclosure.
Figure 15:
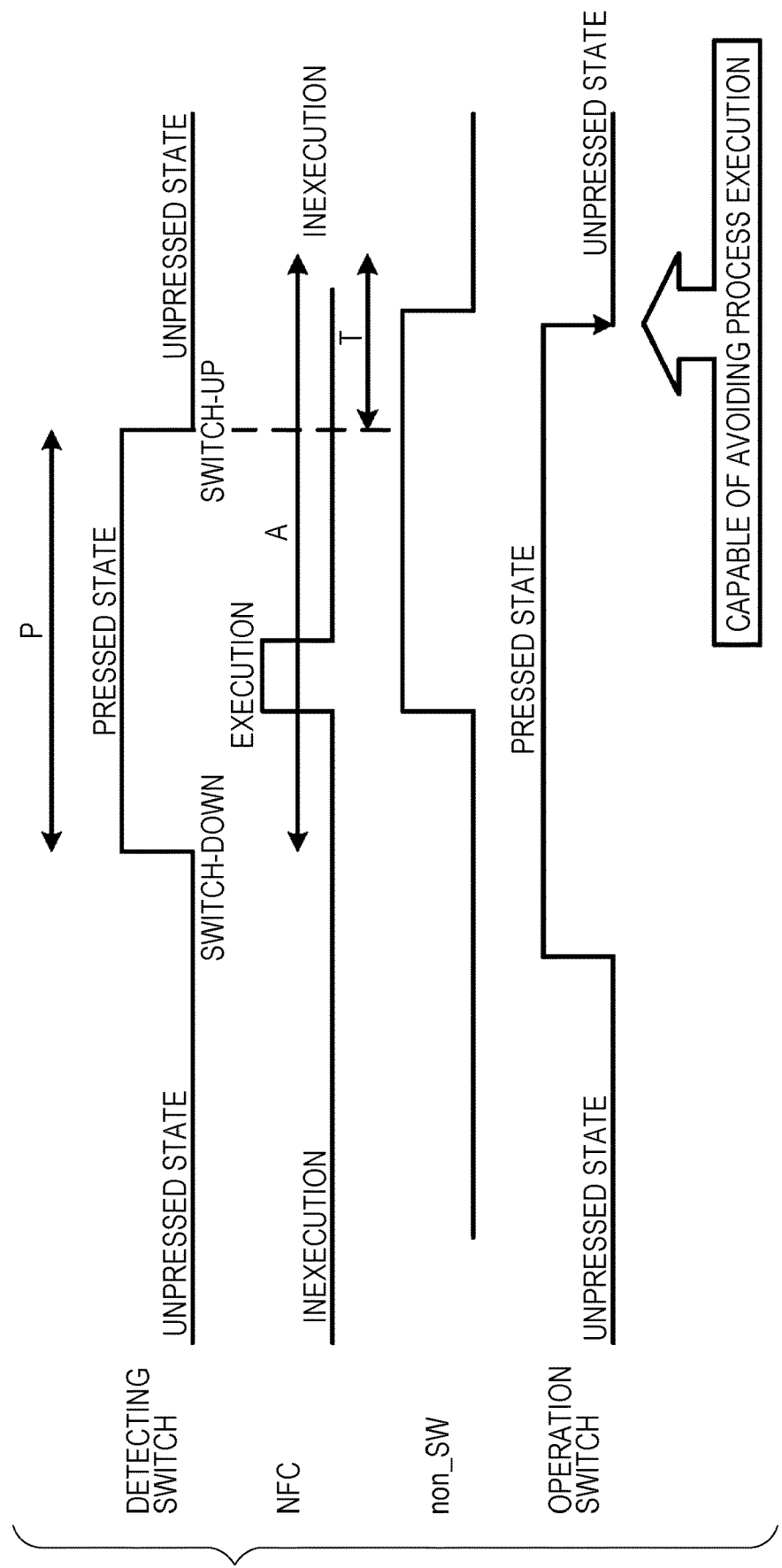
FIG. 15 is a diagram of a third timing for explaining the operation switch press erroneous-detection avoidance method according to the fourth embodiment of the present disclosure.

FIGS. 13, 14, and 15 are diagrams of timings in a case where an operation switch press erroneous-detection avoidance method according to the fourth embodiment is executed.

FIG. 13 illustrates a case where the user's finger or the like presses the operation switch. Since the detecting switch is not pressed before the switch-up occurs according to the operation switch being pressed and the NFC is not executed, it is determined that the switch-up occurs by the operation switch being pressed by the user's finger or the like and the process associated with the operation switch is activated.

FIG. 14 illustrates a case where the mobile terminal for performing the NFC apparently presses the operation switch and the NFC is executed. If the NFC execution is detected during a predetermined period (actually, period which continues for certain period of time or more) included in a prohibition flag settable period (period when timer TIMER is not zero in Example 4 to be described below) having a start time when the switch-down according to the detecting switch disposed in the vicinity of the operation switch being pressed occurs and an end time when the prescribed period T elapses after the switch-up of the detecting switch occurs, the prohibition flag non_SW is set. When the switch-up according to the operation switch being pressed occurs at the state in which the prohibition flag non_SW is set, it is determined that the switch-up occurs by the operation switch being apparently pressed by the mobile terminal and it is possible to avoid the process associated with the operation switch from being activated.

In addition, if the NFC execution is not detected during the prohibition flag settable period, the prohibition flag non_SW is not set.

As described above, FIG. 15 illustrates that if the detecting switch disposed near the operation switch is apparently pressed by the mobile terminal and the NFC is executed during a prohibition flag settable period A (=detecting switch press period P+prescribed period T), the case where the process related to the operation switch is activated by the switch-up according to the operation switch being pressed, is avoided. Here, the case where the NFC is executed during the prohibition flag settable period A (=detecting switch press period P+prescribed period T) means that the NFC is executed in a part or all of the prohibition flag settable period A. To this extent, the NFC may additionally be executed before and after the prohibition flag settable period A.

In particular, there is a tolerance on a preceding period of the NFC start for the switch-down according to the detecting switch being pressed, a total period of the NFC, a period when the detecting switch is pressed, a timing of the switch-down according to the operation switch being pressed, or a timing of the switch-up according to the operation switch being pressed. A prescribed limit may be set for the tolerance. In addition, the prescribed periods described above can be adjusted.

Further, a signal related to the detecting switch being pressed and a signal related to the NFC detection may be exchanged. In this case, a signal of the detecting switch and a signal of the NFC detection in FIG. 15 are exchanged.

Fifth Embodiment

Figure 16:
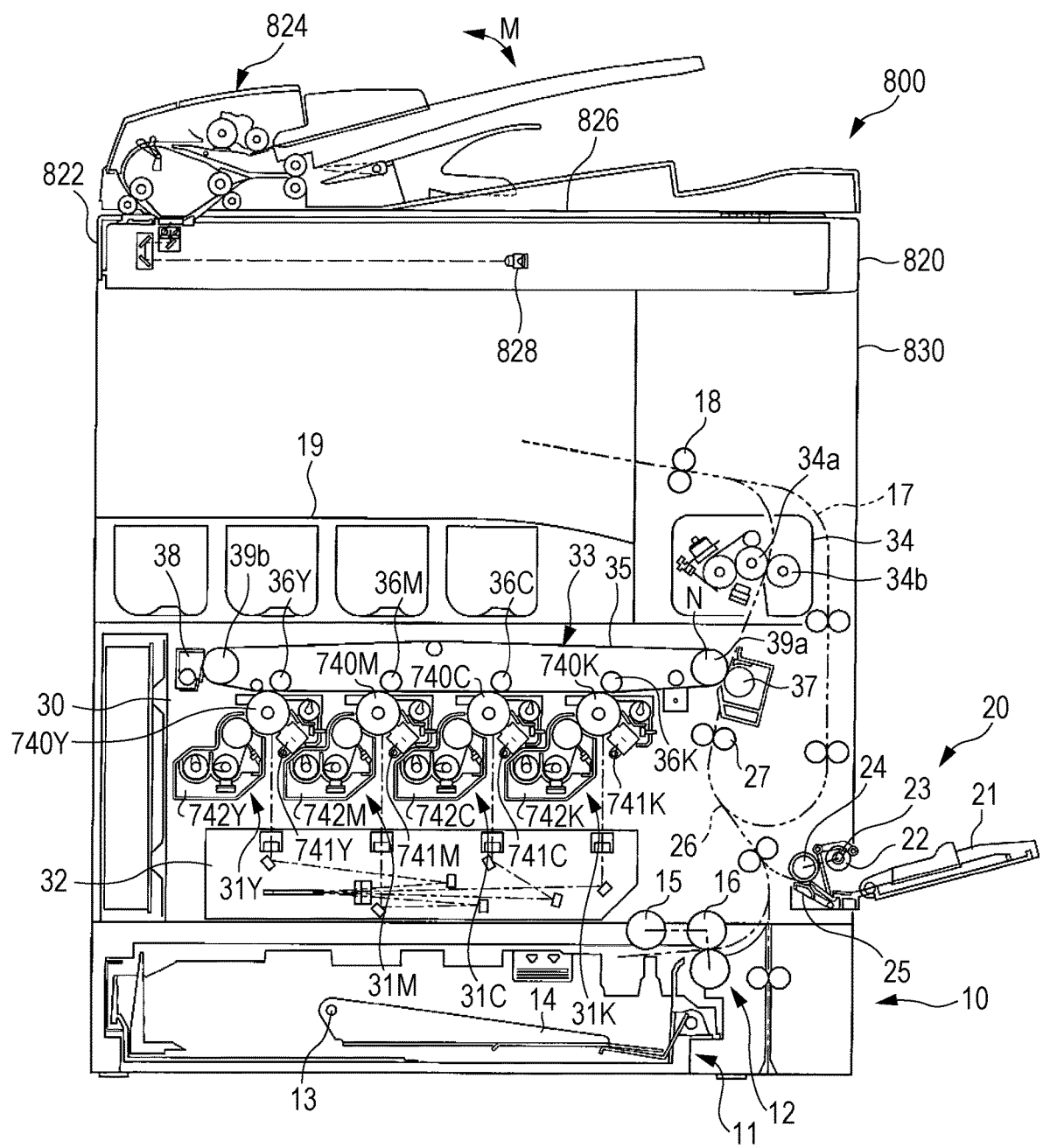
FIG. 16 is a conceptual cross-section diagram illustrating a multifunctional machine according to a fifth embodiment of the present disclosure.
Figure 17:
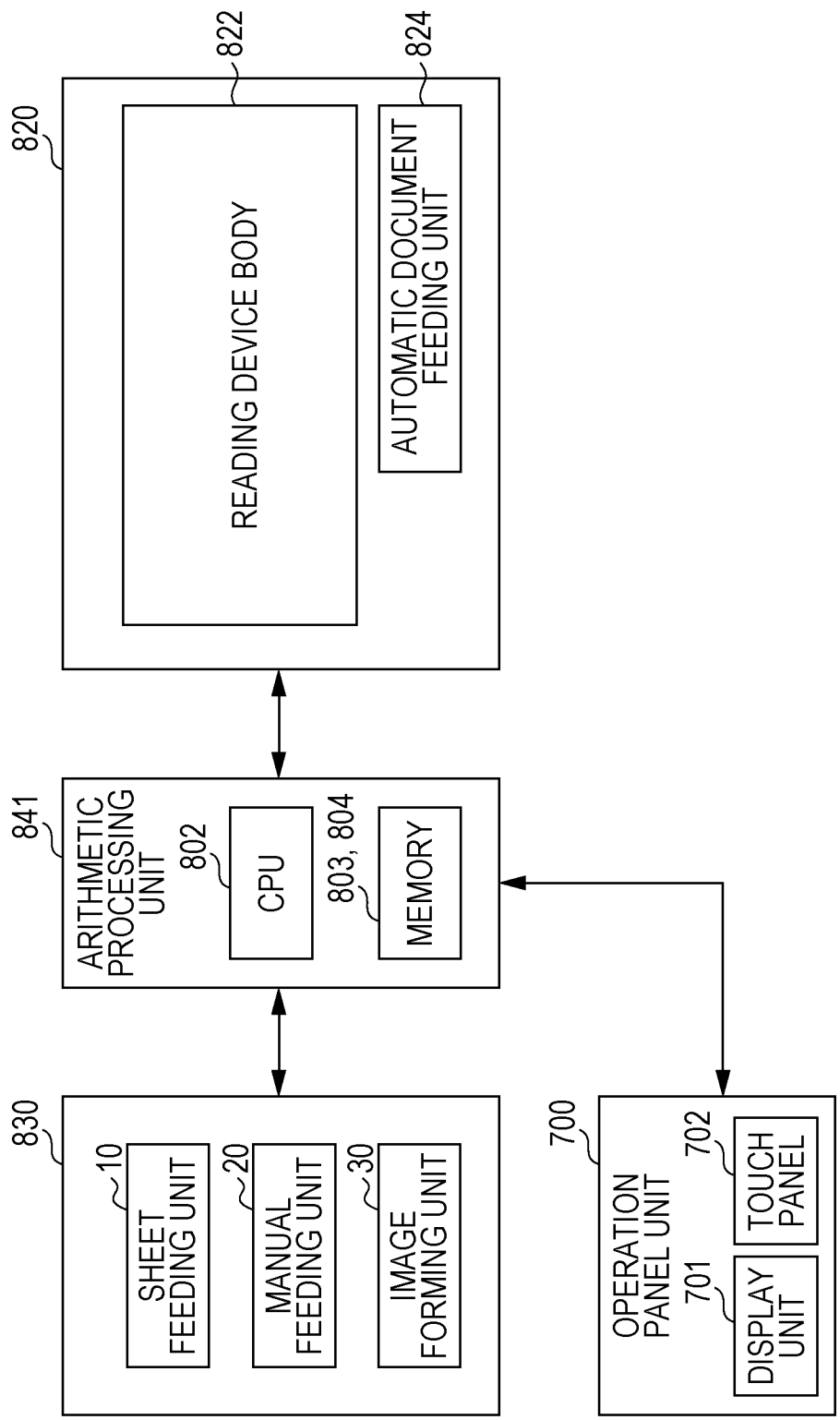
FIG. 17 is a functional block diagram illustrating the multifunctional machine according to the fifth embodiment of the present disclosure.

A fifth embodiment is related to the multifunctional machine 800 including a document reading device according to the first to fourth embodiments. FIGS. 16 and 17 illustrate a configuration of the multifunctional machine 800.

As illustrated in FIGS. 16 and 17, the multifunctional machine 800 includes a document reading device 820 which reads an image of a document, a multifunctional machine body (image forming unit body) 830 which forms an image on a sheet, the operation panel unit 700 which operates the document reading device 820 and the multifunctional machine body 830, and an arithmetic processing unit 841 which controls the document reading device 820 and the multifunctional machine body 830 based on the operation of the operation panel unit 700.

The single document reading device 820 may be used for reading the image or single multifunctional machine body 830 may be used for forming the image, and the document reading device 820 and the multifunctional machine body 830 may be interworked with each other for copying the image. In addition, the multifunctional machine 800 may include a storage device and a facsimile device (not illustrated). The storage device can store the image read by the document reading device 820 or the image received by the facsimile device. The facsimile device can transmit the image read by the document reading device 820 or the image stored in the storage device and can receive the image from an outside. Further, the multifunctional machine 800 may include an interface for connecting with a personal computer via a network. The personal computer connected to the multifunctional machine 800 can use a function of the multifunctional machine for data which the personal computer can manage.

The document reading device 820 includes an automatic document feeding unit (single pass feeder: SPF) 824 for automatically feeding a document and a reading device body 822 which reads the image of the document. In addition to the components illustrated in FIG. 17, the document reading device 820 also includes the components illustrated in FIG. 16 although not illustrated in FIG. 17. Further, as illustrated in FIG. 16, the reading device body 822 includes a document stand 826.

The multifunctional machine body 830 includes a sheet feeding unit 10 which feeds the sheet, a manual feeding unit 20 capable of manually feeding the sheet, and an image forming unit 30 which forms the image on the sheet fed by the sheet feeding unit 10 or the manual feeding unit 20.

The sheet feeding unit 10 includes a sheet loading unit 11 which loads the sheet and a separate feeding unit 12 which separately feeds the sheet one by one loaded in the sheet loading unit 11. The sheet loading unit 11 includes a middle plate 14 which pivots around a rotation shaft 13 and the middle plate 14 pivots and lifts the sheet upward when the sheet is fed. The separate feeding unit 12 includes a pickup roller 15 which feeds the sheet lifted by the middle plate 14 and a separation roller pair 16 which separate the sheet one by one fed by the pickup roller 15.

The manual feeding unit 20 includes a manual feed tray 21 which can load the sheet and a separate feeding unit 22 which separately feeds the sheet one by one loaded in the manual feed tray 21. The manual feed tray 21 is rotatably supported by the multifunctional machine body 830 and can load the sheet by being fixed at a prescribed angle when the sheet is manually fed. The separate feeding unit 22 includes a pickup roller 23 which feeds the sheet loaded in the manual feed tray 21, and a separation roller 24 and a separation pad 25 which separate the sheet one by one fed by the pickup roller 23.

The image forming unit 30 includes four process cartridges 31Y to 31K for forming the image of yellow (Y), magenta (M), cyan (C), and black (K), photosensitive drums 740Y to 740K to be described below, an exposure device 32 for exposing surfaces of the photosensitive drums 740Y to 740K, a transfer unit (transfer device) 33 for transferring a toner image formed on the surfaces of the photosensitive drums 740Y to 740K to the sheet, and a fixing unit 34 which fixes the transferred toner image to the sheet. The alphabets (Y, M, C, and K) added at an end of the code indicate the respective colors (yellow, magenta, cyan, and black).

Each of the four process cartridges 31Y to 31K is configured to be detachable from the multifunctional machine body 830 and is exchangeable. Since the four process cartridges 31Y to 31K have the same configuration except that the colors of the images to be formed are different, only the configuration of the process cartridge 31Y for forming the image of yellow (Y) will be described, and the description of the process cartridges 31M to 31K will be omitted.

The process cartridge 31Y includes the photosensitive drum 740Y as an image carrier, a charger 741Y for charging the photosensitive drum 740Y, a developing device 742Y for developing an electrostatic latent image formed on the photosensitive drum 740Y, and a drum cleaner for removing toner remaining on the surface of the photosensitive drum 740Y. The developing device 742Y includes a developing device body (not illustrated in detail) for developing the photosensitive drum 740Y and a toner cartridge (not illustrated in detail) for supplying the toner to the developing device body. The toner cartridge is configured to be detachable from the developing device body. When the stored toner is exhausted, the toner cartridge can be detached from the developing device body and the toner can be exchanged.

The exposure device 32 includes a light source (not illustrated) for irradiating a laser beam, a plurality of mirrors (not illustrated) for guiding the laser beam to the photosensitive drums 740Y to 740K, and the like. The transfer unit 33 includes an intermediate transfer belt 35 which carries the toner image formed on the photosensitive drums 740Y to 740K, primary transfer rollers 36Y to 36K which primarily transfer the toner images formed on the photosensitive drums 740Y to 740K to the intermediate transfer belt 35, a secondary transfer roller 37 which secondarily transfers the toner image transferred to the intermediate transfer belt 35 to the sheet, and a belt cleaner 38 which removes the toner remaining on the intermediate transfer belt 35. The intermediate transfer belt 35 is wound around a driving roller 39a and a driven roller 39b and is pushed against the photosensitive drums 740Y to 740K by the primary transfer rollers 36Y to 36K. The secondary transfer roller 37 nips (clamps) the intermediate transfer belt 35 with the driving roller 39a and transfers the toner image carried by the intermediate transfer belt 35 to the sheet at a nip unit N. The fixing unit 34 includes a heating roller 34a for heating the sheet and a pressure roller 34b for pressing the heating roller 34a.

The operation panel unit 700 includes the display unit 701 which displays prescribed information and the touch panel 702 for the user to input an instruction to the document reading device 820 and the multifunctional machine body 830. In the present embodiment, the operation panel unit 700 is disposed on a front side of the reading device body 822. The front side corresponds to a front side a page of FIG. 16 and a back side corresponds to a rear side of FIG. 16.

As illustrated in FIG. 17, the arithmetic processing unit 841 includes the CPU 802 which drives and controls the sheet feeding unit 10, the manual feeding unit 20, the image forming unit 30, and the document reading device 820, and the memory 803 and the memory 804 which store various programs for operating the CPU 802 and various information used by the CPU 802. The arithmetic processing unit 841 generally controls operations of the sheet feeding unit 10, the manual feeding unit 20, the image forming unit 30, and the document reading device 820 and forms the image on the sheet based on an operation to the operation panel unit 700 by the user.

Next, an image forming operation (image forming control by arithmetic processing unit 841) by the multifunctional machine 800 configured as described above will be described. In the present embodiment, as an example, the image forming operation, in which the image forming unit 30 forms an image of the read document fed by the automatic document feeding unit 824 and read by the reading device body 822 on a sheet fed by the sheet feeding unit 10, will be described.

When an image forming start signal is transmitted by an input to the touch panel 702 of an operation panel unit 843 by the user, the document to be read placed on the automatic document feeding unit 824 by the user is automatically fed toward a document reading position and the reading device body 822 reads the image at the document reading position.

When the reading device body 822 reads the image of the document, the exposure device 32 irradiates a plurality of laser beams corresponding to the respective photosensitive drums 740Y to 740K toward the photosensitive drums 740Y to 740K based on image information of the read document. At this time, the photosensitive drums 740Y to 740K are respectively charged in advance by the chargers 741Y to 741K, and if the laser beams corresponding to the respective photosensitive drums 740Y to 740K are irradiated, the respective electrostatic latent images are formed on the photosensitive drums 740Y to 740K. After then, the electrostatic latent images respectively formed on the photosensitive drums 740Y to 740K are developed by the developing devices 742Y to 742K and toner images of yellow (Y), magenta (M), cyan (C), and black (K) are formed on the photosensitive drums 740Y to 740K. The toner images of the respective colors formed on the photosensitive drums 740Y to 740K are superimposed and transferred to the intermediate transfer belt 35 by the primary transfer rollers 36Y to 36K and the superimposed and transferred toner image (full-color toner image) is transported to the nip unit N while being carried on the intermediate transfer belt 35.

In parallel to the image forming operation described above, the sheet loaded on the sheet loading unit 11 is fed to a sheet transport path 26 by the pickup roller 15 while being separated one by one by the separate feeding unit 12. Then, the skew feeding is corrected by resistance roller pair 27 on an upstream side of the nip unit N in a sheet transport direction and is transported to the nip unit N at a prescribed transport timing. The full-color toner image carried by the intermediate transfer belt 35 is transferred by the secondary transfer roller 37 onto the sheet transported to the nip unit N.

The sheet on which the toner image is transferred is heated and pressed by the fixing unit 34 so that the toner image is melted and fixed, and the sheet is discharged outside the device by discharge roller pair 18. The sheet discharged outside the device is loaded on a discharged sheet loading unit 19.

In the case of forming the image on both sides (first surface and second surface) of the sheet, before the sheet on which the image is formed on the first surface is discharged outside the device, the discharge roller pair 18 are rotated in a reverse direction and the sheet is transported to a double-side transport path 17, and the sheet is transported again to the image forming unit 30 via the double-side transport path 17. Then, in the same manner as the first surface, the image is formed on the second surface and the sheet is discharged outside the device. The sheet discharged outside the device is loaded on a discharged sheet loading unit 19.

Example 1

Example 1 is a detailed example of a method corresponding to the first embodiment.

Figure 18A:
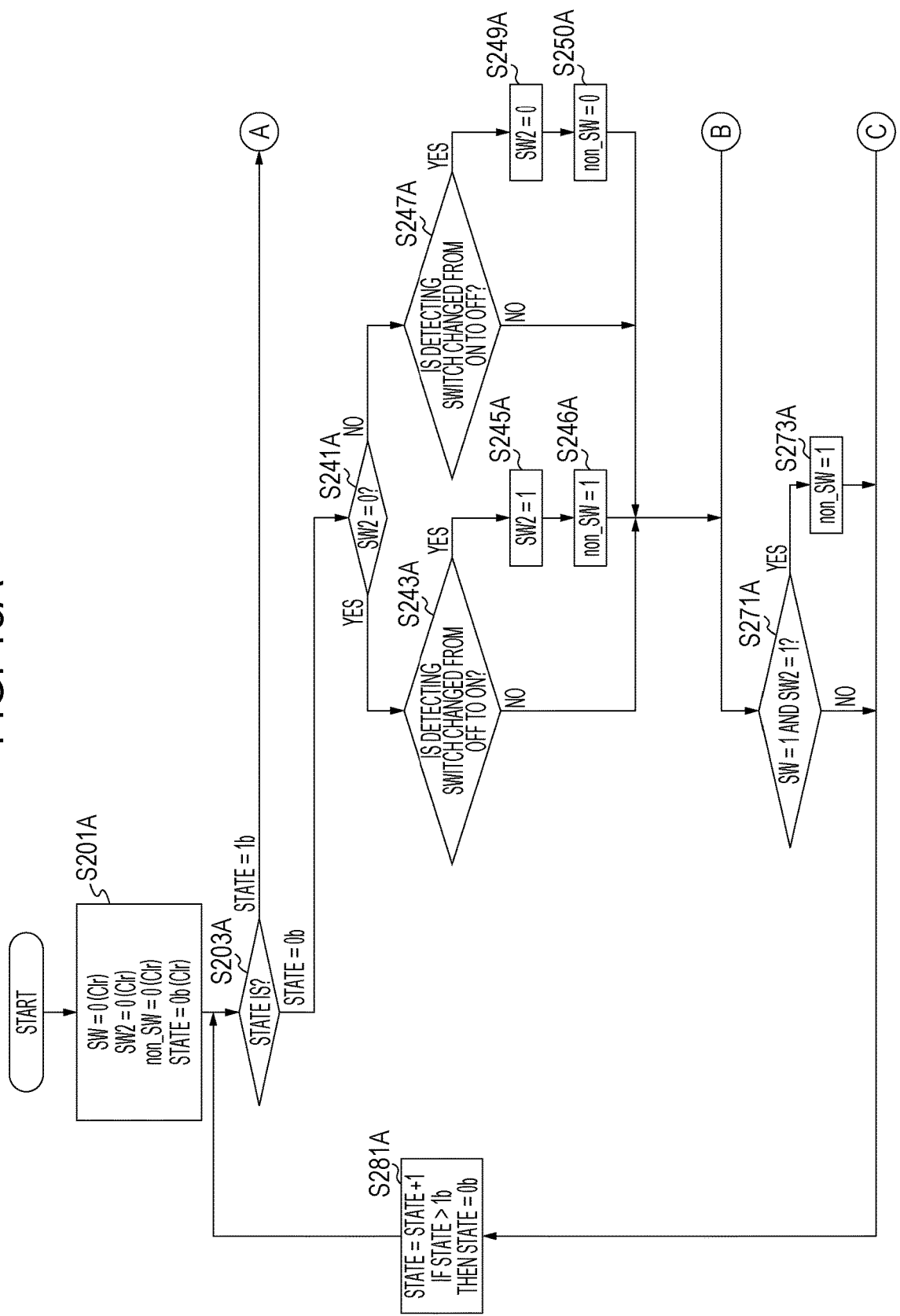
FIG. 18A is a flowchart (1/2) for explaining an operation switch press erroneous-detection avoidance method according to Example 1 of the present disclosure.

With reference to FIGS. 18A and 18B, firstly, a press flag SW indicating whether or not a capacitance detecting switch (hereinafter, referred to as "operation switch") for operating the device is pressed is reset to zero, an apparent press flag SW2 indicating whether or not the detecting switch is apparently pressed by the mobile terminal is reset to zero, an invalidity flag non_SW for invalidating the operation switch is reset to zero, and a state flag STATE for controlling a flow is reset to zero (step S201A). Here, invalidating the operation switch is to avoid the process related to the operation switch from being activated by the switch-down regarding the operation switch.

Next, a value of the state flag STATE is examined (step S203A).

If the state flag STATE is 1b, the process proceeds to step S211A, and if the state flag STATE is 0b, the process proceeds to step S241A.

In step S211A, it is examined whether or not the press flag SW is zero.

If the press flag SW is 1 (NO in step S211A), it means that the switch-down occurs when step S215A is executed in the previous iteration of the operation switch. Since there is a possibility that the process associated with the operation switch is desired to be activated, it is examined whether or not the invalidity flag non_SW is zero (step S221A).

If the invalidity flag non_SW is zero (YES in step S221A), the process associated with the operation switch is activated (step S223A).

If the invalidity flag non_SW is not zero (NO in step S221A), the activation of the process associated with the operation switch is avoided. Therefore, since step S223A is bypassed, it is possible to avoid the process related to the operation switch from being activated by the switch-down which occurs at the start time when the operation switch is apparently pressed by the approaching mobile terminal.

After step S221A or step S223A, if the operation switch is changed from ON to OFF (step S226A), the press flag SW is reset to zero (step S227A) and the process proceeds to step S281A.

If the press flag SW is zero (YES in step S211A), it is examined whether or not the operation switch is turned ON (step S213A).

If the operation switch is turned ON (YES in step S213A), it means that the switch-down for the operation switch occurs, so that the press flag SW is set to 1 (step S215A) and the process proceeds to step S271A.

If the operation switch is not turned ON (NO in step S213A), the operation switch is kept released, so that the press flag SW is kept at zero and the process proceeds to step S271A.

In step S241A, it is examined whether or not the apparent press flag SW2 is 1.

If the apparent press flag SW2 is zero (YES in step S241A), it is examined whether or not the detecting switch is turned ON. If the detecting switch is turned ON (YES in step S243A), the switch-down for the detecting switch occurs, so that the apparent press flag SW2 is set to 1 (step S245A), the invalidity flag non_SW is further set to 1 (step S246A), and the process proceeds to step S271A.

If the apparent press flag SW2 is zero (YES in step S241A), it is examined whether or not the detecting switch is turned ON. If the detecting switch is not turned ON (NO in step S243A), the detecting switch is kept released, so that the apparent press flag SW2 is kept at zero and the process proceeds to step S271A.

If the apparent press flag SW2 is 1 (NO in step S241A), it is examined whether or not the detecting switch is turned OFF. If the detecting switch is turned OFF (YES in step S247A), the switch-up for the detecting switch occurs, so that the apparent press flag SW2 is reset to zero (step S249A), the invalidity flag non_SW is reset to zero (step S250A), and the process proceeds to step S271A.

If the apparent press flag SW2 is 1 (NO in step S241A), it is examined whether or not the detecting switch is turned OFF. If the detecting switch is not turned OFF (NO in step S247A), the detecting switch is kept pressed, so that the apparent press flag SW2 is kept at 1 and the process proceeds to step S271A.

In step S271A, the press flag SW is 1 and it is examined whether or not the apparent press flag SW2 is 1. If the apparent press flag SW2 is 1, the invalidity flag non_SW is set to 1 (step S273A). In a case where the period when the detecting switch is pressed is overlapped with the period when the operation switch is pressed, it means that the reason why these switches are pressed at the same time is due to the approaching mobile terminal. Therefore, the invalidity flag non_SW set to 1 at step S273A is effectively used for the determination of NO at step S221A. That is, since immediately after the invalidity flag non_SW is set to 1, the press flag SW is 1 (NO in step S211A) and in step S221A in which it is examined that whether or not the invalidity flag non_SW is zero, it is determined that the invalidity flag non_SW is not zero (NO in step S221A), the activation of the process associated with the operation switch is avoided.

The process proceeds from step S271A or step S273A to step S281A.

In step S281A, the state flag STATE is increased by 1 and if the state flag STATE is larger than 1b after the increase, the state flag STATE is returned to 0b.

Example 2

Example 2 is a detailed example of a method corresponding to the second embodiment.

Figure 19A:
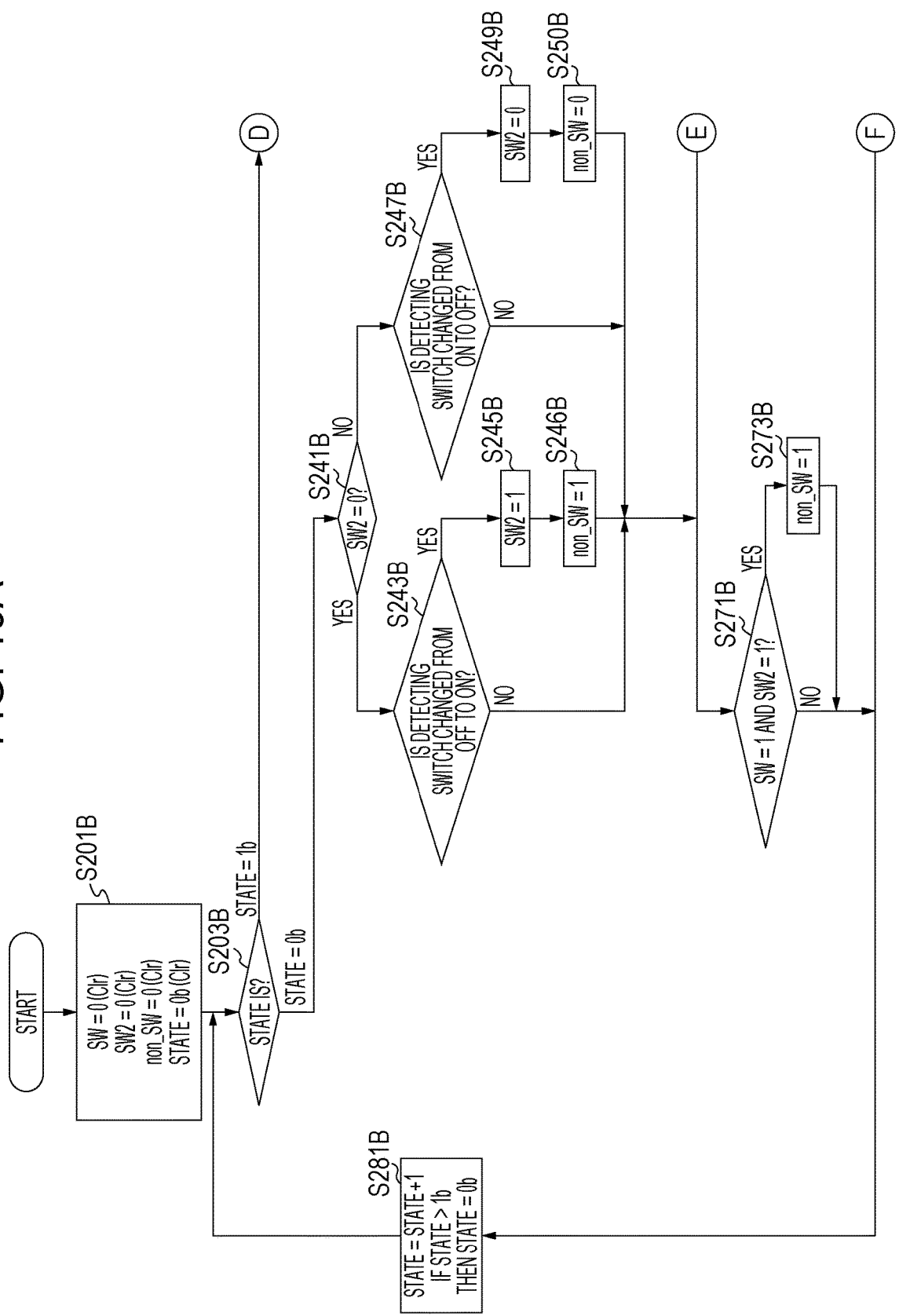
FIG. 19A is a flowchart (1/2) for explaining an operation switch press erroneous-detection avoidance method according to Example 2 of the present disclosure.
Figure 19B:
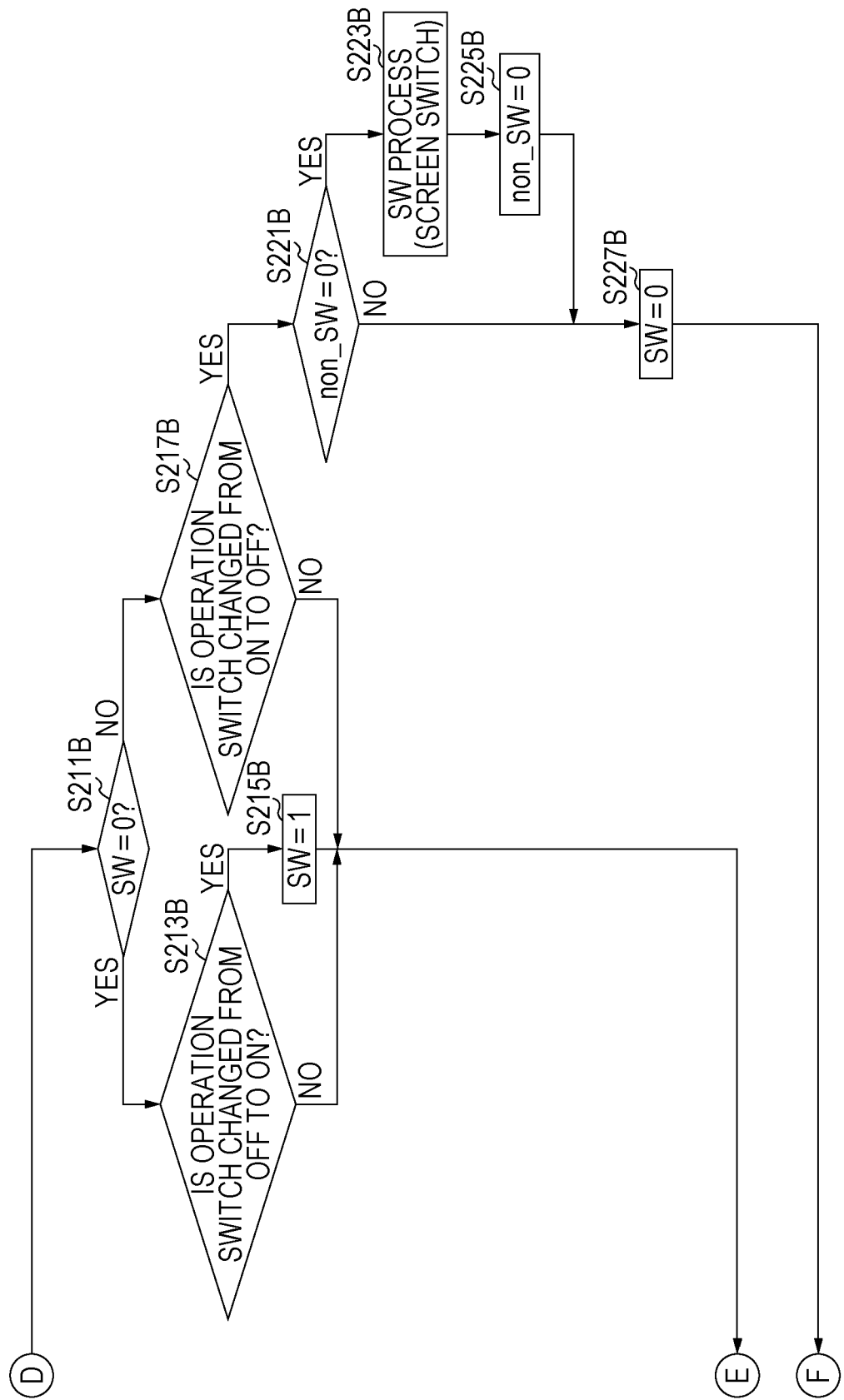
FIG. 19B is a flowchart (2/2) for explaining the operation switch press erroneous-detection avoidance method according to Example 2 of the present disclosure.

With reference to FIGS. 19A and 19B, firstly, a press flag SW indicating whether or not a capacitance detecting switch (hereinafter, referred to as "operation switch") for operating the device is pressed is reset to zero, an apparent press flag SW2 indicating whether or not the detecting switch is apparently pressed by the mobile terminal is reset to zero, an invalidity flag non_SW for invalidating the operation switch is reset to zero, and a state flag STATE for controlling a flow is reset to zero (step S201B). Here, invalidating the operation switch is to avoid the process related to the operation switch from being activated by the switch-up regarding the operation switch.

Next, a value of the state flag STATE is examined (step S203B).

If the state flag STATE is 1b, the process proceeds to step S211B, and if the state flag STATE is 0b, the process proceeds to step S241B.

In step S211B, it is examined whether or not the press flag SW is zero.

If the press flag SW is 1 (NO in step S211B), it is examined whether or not the operation switch is turned OFF (step S217B).

If the operation switch is turned OFF when the press flag SW is 1 (YES in step S217B), it means that the switch-up for the operation switch occurs. Since there is a possibility that the process associated with the operation switch is desired to be activated, it is examined whether or not the invalidity flag non_SW is zero. If the invalidity flag non_SW is zero (YES in step S221B), the process associated with the operation switch is activated (step S223B).

If the invalidity flag non_SW is not zero (NO in step S221B) even when the press flag SW is 1 and the operation switch is turned OFF, the activation of the process associated with the operation switch is avoided. Therefore, since the step S223B is bypassed, it is possible to avoid the process related to the operation switch from being activated by the switch-up which occurs at the end time when the operation switch is apparently pressed by the approaching mobile terminal.

After step S221B or step S223B, the press flag SW is reset to zero so as to reflect the state of the current operation switch (step S227B) and the process proceeds to step S281B.

If the press flag SW is 1 (NO in step S211B), it is examined whether or not the operation switch is turned OFF (step S217B). If the operation switch is not turned OFF (NO in step S217B), the switch-up does not occur and the process proceeds to step S271B.

If the press flag SW is zero (YES in step S211B), it is examined whether or not the operation switch is turned ON (step S213B).

If the operation switch is turned ON when the press flag SW is zero (YES in step S213B), it means that the switch-down for the operation switch occurs, so that the press flag SW is set to 1 and the process proceeds to step S271B.

If the operation switch is not turned ON when the press flag SW is zero (NO in step S213B), it means that the operation switch is kept released, so that the press flag SW is kept at zero and the process proceeds to step S271B.

In step S241B, it is examined whether or not the apparent press flag SW2 is zero.

If the apparent press flag SW2 is zero (YES in step S241B), it is examined whether or not the detecting switch is turned ON. If the detecting switch is turned ON (YES in step S243B), the switch-down for the detecting switch occurs, so that the apparent press flag SW2 is set to 1, the invalidity flag non_SW is set to 1, and the process proceeds to step S271B.

If the apparent press flag SW2 is zero (YES in step S241B), it is examined whether or not the detecting switch is turned ON. If the detecting switch is turned ON (YES in step S243B), the switch-down for the detecting switch occurs, so that the apparent press flag SW2 is set to 1 (step S245B), the invalidity flag non_SW is further set to 1 (step S246B), and the process proceeds to step S271B.

If the apparent press flag SW2 is zero (YES in step S241B), it is examined whether or not the detecting switch is turned ON. If the detecting switch is not turned ON (NO in step S243B), the detecting switch is kept released, so that the apparent press flag SW2 is kept at zero and the process proceeds to step S271B.

If the apparent press flag SW2 is 1 (NO in step S241B), it is examined whether or not the detecting switch is turned OFF. If the detecting switch is turned OFF (YES in step S247B), the switch-up for the detecting switch occurs, so that the apparent press flag SW2 is reset to zero (step S249B), the invalidity flag non_SW is reset to zero (step S250B), and the process proceeds to step S271B.

If the apparent press flag SW2 is 1 (NO in step S241B), it is examined whether or not the detecting switch is turned OFF. If the detecting switch is not turned OFF (NO in step S247B), the detecting switch is kept pressed, so that the apparent press flag SW2 is kept at 1 and the process proceeds to step S271B.

In step S271B, the press flag SW is 1 and it is examined whether or not the apparent press flag SW2 is 1. If the apparent press flag SW2 is 1, the invalidity flag non_SW is set to 1 (step S273B). Therefore, in a case where the period when the detecting switch is pressed is overlapped with the period when the operation switch is pressed, it means that the reason why these switches are pressed at the same time is due to the approaching mobile terminal, so that the invalidity flag non_SW is set to 1.

In further detail, if the invalidity flag non_SW is set to 1, the switch-up for the operation switch occurs. When the press flag SW is kept at 1 (NO in step S211B) and the operation switch is turned OFF (YES in step S217B), there is a possibility that the process associated with the operation switch is desired to be activated. If it is examined whether or not the invalidity flag non_SW is zero (step S221B), it is determined that the invalidity flag non_SW is not zero, so that the activation of the process associated with the operation switch is avoided.

In step S281B, the state flag STATE is increased by 1 and if the state flag STATE is larger than 1b after the increase, the state flag STATE is returned to 0b.

Example 3

Example 3 is a detailed example of a method corresponding to the third embodiment.

Figure 20A:
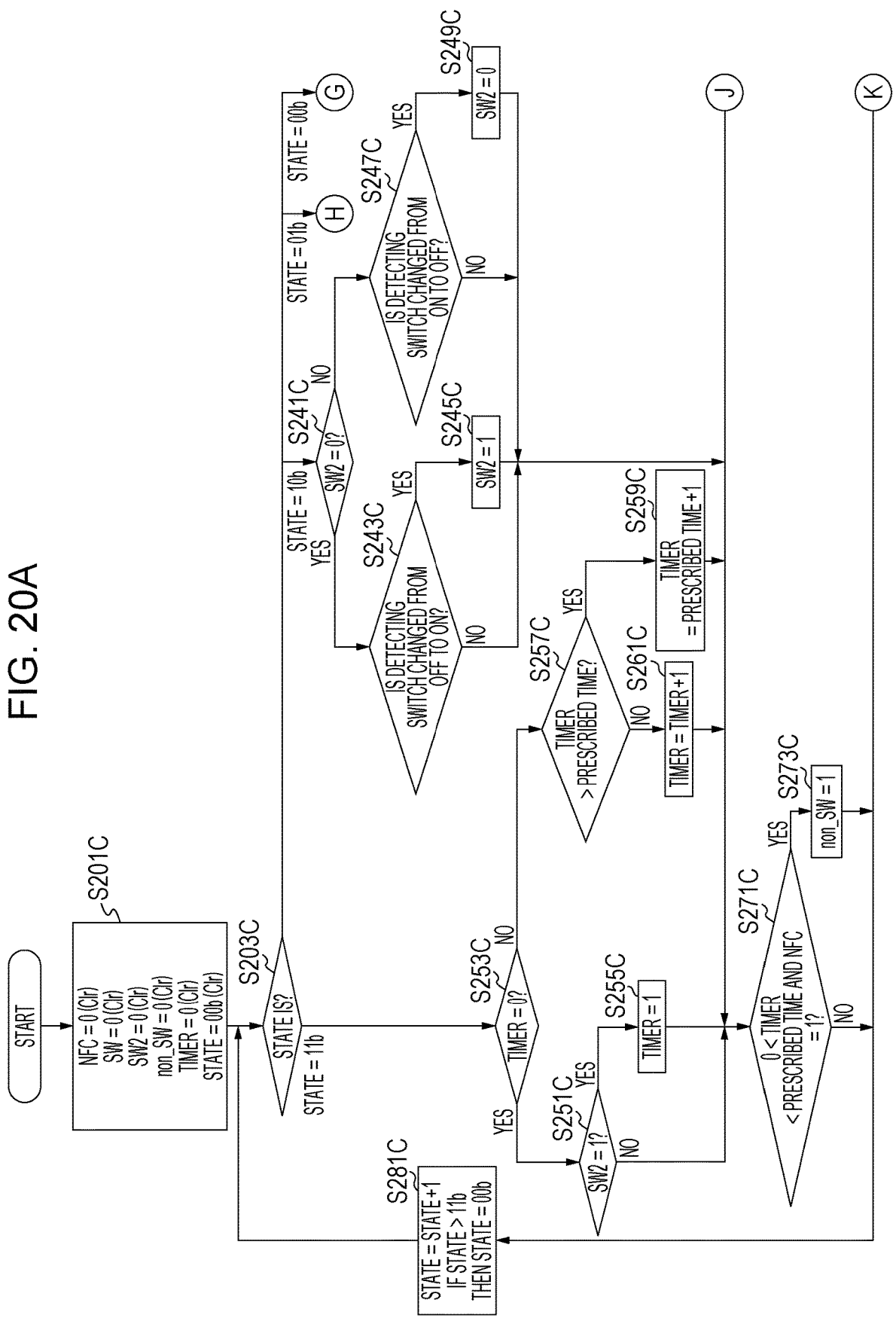
FIG. 20A is a flowchart (1/2) for explaining an operation switch press erroneous-detection avoidance method according to Example 3 of the present disclosure.
Figure 20B:
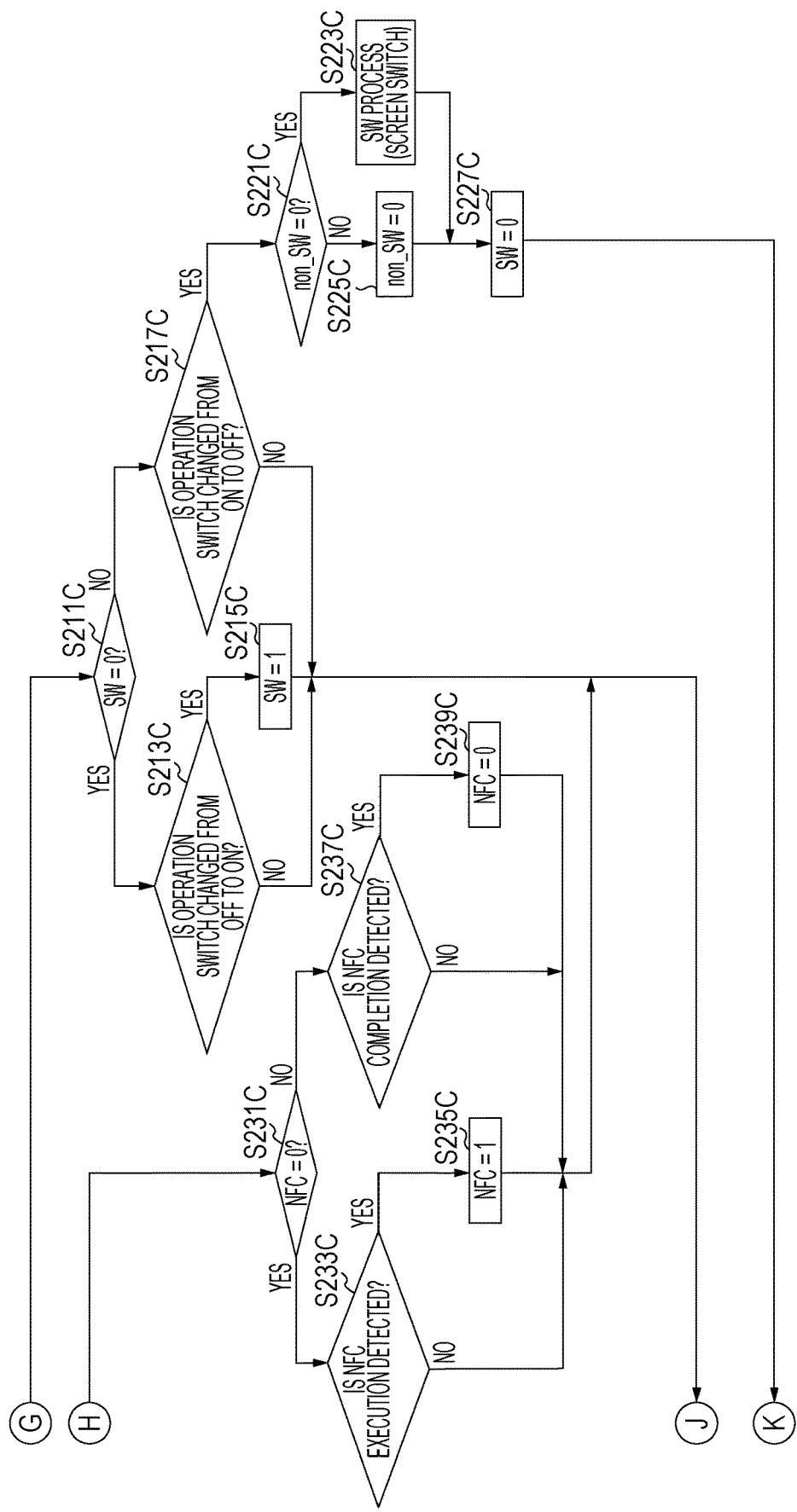
FIG. 20B is a flowchart (2/2) for explaining the operation switch press erroneous-detection avoidance method according to Example 3 of the present disclosure.

With reference to FIGS. 20A and 20B, firstly, a communication flag NFC indicating whether or not the NFC is executed is reset to zero, the press flag SW indicating whether or not a capacitance detecting switch (hereinafter, referred to as "operation switch") for operating the device is pressed is reset to zero, the apparent press flag SW2 indicating whether or not the detecting switch is apparently pressed by the mobile terminal is reset to zero, the invalidity flag non_SW for invalidating the operation switch is reset to zero, the timer TIMER is reset to zero, and the state flag STATE for controlling the flow is reset to zero (step S201C). Here, invalidating the operation switch is to avoid the process related to the operation switch from being activated by the switch-up regarding the operation switch.

Next, a value of the state flag STATE is examined (step S203C).

If the state flag STATE is 00b, the process proceeds to step S211C. If the state flag STATE is 01b, the process proceeds to step S231C. If the state flag STATE is 10b, the process proceeds to step S241C. If the state flag STATE is 11b, the process proceeds to step S253C.

In step S211C, it is examined whether or not the press flag SW is zero.

If the press flag SW is 1 (NO in step S211C), it is examined whether or not the operation switch is turned OFF (step S217C).

If the operation switch is turned OFF when the press flag SW is 1 (YES in step S217C), it means that the switch-up for the operation switch occurs. Since there is a possibility that the process associated with the operation switch is desired to be activated, it is examined whether or not the invalidity flag non_SW is zero. If the invalidity flag non_SW is zero (YES in step S221C), the process associated with the operation switch is activated (step S223C).

If the invalidity flag non_SW is not zero (NO in step S221C) even when the press flag SW is 1 and the operation switch is turned OFF, the activation of the process associated with the operation switch is avoided and the invalidity flag non_SW is reset to zero (step S225C). Therefore, since step S223C is bypassed, it is possible to avoid the process related to the operation switch from being activated by the switch-up which occurs at the end time when the operation switch is apparently pressed by the approaching mobile terminal. In addition, since step S225C is executed, the invalidity flag non_SW is reset to zero, so that the process related to the operation switch may be activated by the switch-up after this which occurs at the end time when the operation switch is pressed by the user's finger.

After step S223C or step S225C, the press flag SW is reset to zero so as to reflect the state of the current operation switch (step S227C) and the process proceeds to step S281C.

If the press flag SW is 1 (NO in step S221C), it is examined whether or not the operation switch is turned OFF. If the operation switch is not turned OFF (NO in step S217C), the switch-up does not occur and the process proceeds to step S271C.

If the press flag SW is zero (YES in step S211C), it is examined whether or not the operation switch is turned ON (step S213C).

If the operation switch is turned ON (YES in step S213C), it means that the switch-down for the operation switch occurs, so that the press flag SW is set to 1 and the process proceeds to step S271C. If the operation switch is not turned ON (NO in step S213C), the operation switch is kept released, so that the press flag SW is kept at zero and the process proceeds to step S271C.

In step S231C, it is examined whether or not the communication flag NFC is zero.

If the communication flag NFC is zero (YES in step S231C) and the NFC execution is detected (YES in step S233C), it means that the NFC which is paused so far is started, so that the communication flag NFC is set to 1 (step S235C) and the process proceeds to step S271C.

If the communication flag NFC is zero (YES in step S231C) and the NFC execution is not detected (NO in step S233C), it means that the NFC continues to be paused, so that without setting the communication flag NFC to 1, the process proceeds to step S271C.

If the communication flag NFC is 1 (NO in step S231C) and the NFC execution is not detected (YES in step S237C), it means that the NFC which is executed so far is completed, so that the communication flag NFC is reset to zero (step S239C) and the process proceeds to step S271C.

If the communication flag NFC is 1 (NO in step S231C) and the NFC execution is detected (NO in step S237C), it means that the NFC continues to be executed, so that the communication flag NFC is reset to zero, the process proceeds to step S271C.

In step S241C, it is examined whether or not the apparent press flag SW2 is 1.

If the apparent press flag SW2 is zero (YES in step S241C), it is examined whether or not the detecting switch is turned ON. If the detecting switch is turned ON (YES in step S243C), the switch-down for the detecting switch occurs, so that the apparent press flag SW2 is set to 1 and the process proceeds to step S271C.

If the apparent press flag SW2 is zero (YES in step S241C), it is examined whether or not the detecting switch is turned ON. If the detecting switch is not turned ON (NO in step S243C), the detecting switch is kept released, so that the apparent press flag SW2 is kept at zero and the process proceeds to step S271C.

In step S253C, it is examined whether or not the timer TIMER is zero.

If the timer TIMER is zero (YES in step S253C) and the apparent press flag SW2 is 1 (YES in step S251C), the detecting switch is at the switch-press state but the timer TIMER is not activated, so that the timer TIMER is set to 1 so as to activate the timer (step S255C).

If the timer TIMER is not zero (NO in step S253C), the timer TIMER is increased (step S261C) when the timer TIMER is not equal to or longer than a prescribed time (NO in step S257C). If the timer TIMER is equal to or longer than the prescribed time (actually prescribed time+1), the timer TIMER is kept at the prescribed time+1.

In step S271C, it is examined whether or not the timer TIMER exceeds zero and is smaller than the prescribed time, and the communication flag NFC is set to 1. If the timer TIMER exceeds zero and is smaller than the prescribed time, and the communication flag NFC is set to 1, the invalidity flag non_SW is set to 1 (step S273C). Therefore, if the communication flag NFC is set to 1 until the prescribed period T elapses after the detecting switch is apparently pressed by the mobile terminal, it means that the reason why the switch-down for the detecting switch occurs is due to the approaching mobile terminal, so that the invalidity flag non_SW is set to 1. If the communication flag NFC is reset to zero during a period until the prescribed time elapses after the detecting switch is apparently pressed by the mobile terminal, it does not mean that the reason why the switch-down for the detecting switch occurs is due to the approaching mobile terminal, so that the invalidity flag non_SW is not set to 1.

In further detail, if the invalidity flag non_SW is set to 1, the switch-up for the operation switch occurs. When the press flag SW is kept at 1 (NO in step S211C) and the operation switch is turned OFF (YES in step S217C), there is a possibility that the process associated with the operation switch is desired to be activated. If it is examined whether or not the invalidity flag non_SW is zero (step S221C), it is determined that the invalidity flag non_SW is not zero, so that the activation of the process associated with the operation switch is avoided. In addition, the invalidity flag non_SW is reset to zero (step S225C).

In step S281C, the state flag STATE is increased by 1 and if the state flag STATE is larger than 11b after the increase, the state flag STATE is returned to 00b.

Example 4

Example 4 is a detailed example of a method corresponding to the fourth embodiment.

Figure 21A:
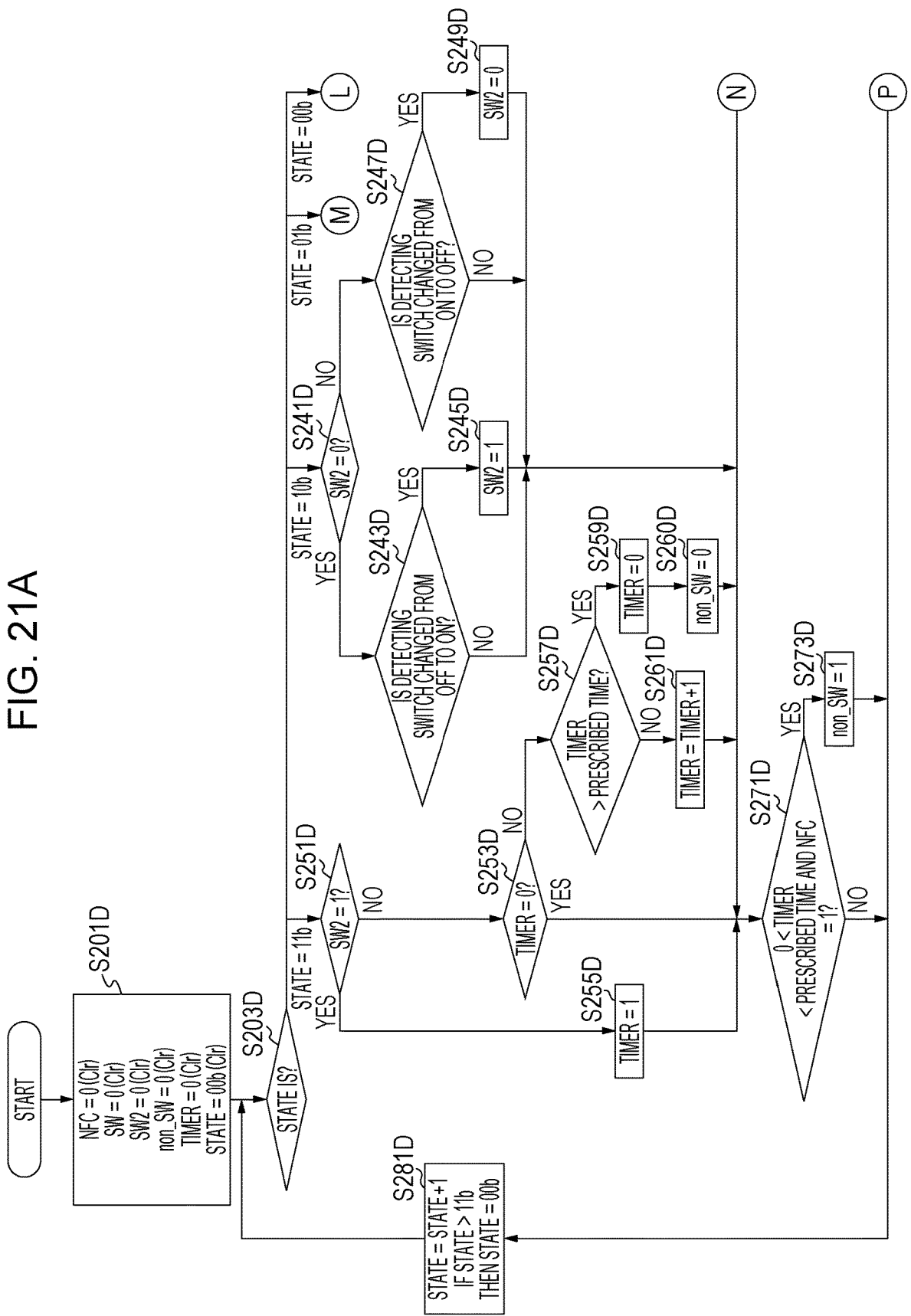
FIG. 21A is a flowchart (1/2) for explaining an operation switch press erroneous-detection avoidance method according to Example 4 of the present disclosure.

With reference to FIGS. 21A and 21B, firstly, a communication flag NFC indicating whether or not the NFC is executed is reset to zero, the press flag SW indicating whether or not a capacitance detecting switch (hereinafter, referred to as "operation switch") for operating the device is pressed is reset to zero, the apparent press flag SW2 indicating whether or not the detecting switch is apparently pressed by the mobile terminal is reset to zero, the invalidity flag non_SW for invalidating the operation switch is reset to zero, the timer TIMER is reset to zero, and the state flag STATE for controlling the flow is reset to zero (step S201D). Here, invalidating the operation switch is to avoid the process related to the operation switch from being activated by the switch-up regarding the operation switch.

Next, a value of the state flag STATE is examined (step S203D).

If the state flag STATE is 00b, the process proceeds to step S211D. If the state flag STATE is 01b, the process proceeds to step S231D. If the state flag STATE is 10b, the process proceeds to step S241D. If the state flag STATE is 11b, the process proceeds to step S251D.

In step S211D, it is examined whether or not the press flag SW is zero.

If the press flag SW is 1 (NO in step S211D), it is examined whether or not the operation switch is turned OFF. If the operation switch is turned OFF (YES in step S217D), it means that the switch-up for the operation switch occurs. Since there is a possibility that the process associated with the operation switch is desired to be activated, it is examined whether or not the invalidity flag non_SW is zero. If the invalidity flag non_SW is zero (YES in step S221D), the process associated with the operation switch is activated (step S223D).

If the invalidity flag non_SW is not zero (NO in step S221D) even when the press flag SW is 1 and the operation switch is turned OFF, the activation of the process associated with the operation switch is avoided and the invalidity flag non_SW is reset to zero (step S225D). Therefore, since step S223D is bypassed, it is possible to avoid the process related to the operation switch from being activated by the switch-up which occurs at the end time when the operation switch is apparently pressed by the approaching mobile terminal. In addition, since step S225D is executed, the invalidity flag non_SW is reset to zero, so that the process related to the operation switch may be activated by the switch-up after this which occurs at the end time when the operation switch is pressed by the user's finger.

After step S223D or step S225D, the press flag SW is reset to zero so as to reflect the state of the current operation switch (step S227D) and the process proceeds to step S281D.

If the press flag SW is 1 (NO in step S221D), it is examined whether or not the operation switch is turned OFF. If the operation switch is not turned OFF (NO in step S217D), the switch-up does not occur and the process proceeds to step S271D.

If the press flag SW is zero (YES in step S211D), it is examined whether or not the operation switch is turned ON (step S213D).

If the operation switch is turned ON when the press flag SW is zero (YES in step S213D), it means that the switch-down for the operation switch occurs, so that the press flag SW is set to 1 (step S215D) and the process proceeds to step S271D.

If the operation switch is not turned ON when the press flag SW is zero (NO in step S213D), it means that the operation switch is kept released, so that the press flag SW is kept at zero and the process proceeds to step S271D.

In step S231D, it is examined whether or not the communication flag NFC is zero.

If the communication flag NFC is zero (YES in step S231D) and the NFC execution is detected (YES in step S233D), it means that the NFC which is paused so far is started, so that the communication flag NFC is set to 1 (step S235D) and the process proceeds to step S271D.

If the communication flag NFC is zero (YES in step S231D) and the NFC execution is not detected (NO in step S233D), it means that the NFC continues to be paused, so that without setting the communication flag NFC to 1, the process proceeds to step S271D.

If the communication flag NFC is 1 (NO in step S231D) and the NFC execution is not detected (YES in step S237D), it means that the NFC which is executed so far is completed, so that the communication flag NFC is reset to zero (step S239D) and the process proceeds to step S271D.

If the communication flag NFC is 1 (NO in step S231D) and the NFC execution is detected (NO in step S237D), it means that the NFC continues to be executed, so that the communication flag NFC is reset to zero, the process proceeds to step S271D.

In step S241D, it is examined whether or not the apparent press flag SW2 is 0.

If the apparent press flag SW2 is zero (YES in step S241D), it is examined whether or not the detecting switch is turned ON. If the detecting switch is turned ON (YES in step S243D), the switch-down for the detecting switch occurs, so that the apparent press flag SW2 is set to 1 and the process proceeds to step S271D.

If the apparent press flag SW2 is zero (YES in step S241D), it is examined whether or not the detecting switch is turned ON. If the detecting switch is not turned ON (NO in step S243D), the detecting switch is kept released, so that the apparent press flag SW2 is kept at zero and the process proceeds to step S271D.

If the apparent press flag SW2 is 1 (NO in step S241D), it is examined whether or not the detecting switch is turned OFF. If the detecting switch is turned OFF (YES in step S247D), it means that the detecting switch is not pressed, so that the apparent press flag SW2 is reset to zero (step S249D) and the process proceeds to step S271D.

If the apparent press flag SW2 is 1 (NO in step S241D), it is examined whether or not the detecting switch is turned OFF. If the detecting switch is not turned OFF (NO in step S247D), it means that the detecting switch is kept pressed, so that the apparent press flag SW2 is kept at 1 and the process proceeds to step S271D.

In step S251D, it is examined whether or not the apparent press flag SW2 is 1.

If the apparent press flag SW2 is 1 (YES in step S251D), it means that the detecting switch is pressed, so that the timer TIMER is set to 1 (step S255D) and the process proceeds to step S271D. Therefore, while the detecting switch is pressed, the timer TIMER is continuously kept at 1.

If the apparent press flag SW2 is zero (NO in step S251D), it means that the detecting switch is not pressed. In this case, it is examined whether or not the timer TIMER is zero (step S253D).

If the timer TIMER is not zero (NO in step S253D), it means that the timer TIMER continues to count. If a value of the timer TIMER is smaller than the prescribed time (NO in step S257D), the value of the timer TIMER is increased (step S261D) and the process proceeds to step S271D.

In addition, the value of the timer TIMER reaches the prescribed time (YES in step S257D), the timer TIMER is reset to zero (step S259D) and the invalidity flag non_SW is reset to zero (step S260D), then the process proceeds to step S271D.

According to this, the timer has a value (from 1 to value corresponding to prescribed time) other than zero during a period after the switch-down according to the detecting switch being pressed occurs until the prescribed period elapses after the switch-up according to the press occurs.

In step S271D, it is examined whether or not the timer TIMER exceeds zero and is smaller than the prescribed time, and the communication flag NFC is set to 1. If the timer TIMER exceeds zero and is smaller than the prescribed time, and the communication flag NFC is set to 1, the invalidity flag non_SW is set to 1 (step S273D). Therefore, if the communication flag NFC is set to 1 after the detecting switch is apparently pressed by the mobile terminal until the prescribed period elapses after the press is completed, it means that the reason why the switch-down for the detecting switch occurs is due to the approaching mobile terminal, so that the invalidity flag non_SW is set to 1.

In further detail, if the invalidity flag non_SW is set to 1, the switch-up for the operation switch occurs. When the press flag SW is kept at 1 (NO in step S211D) and the operation switch is turned OFF (YES in step S217D), there is a possibility that the process associated with the operation switch is desired to be activated. If it is examined whether or not the invalidity flag non_SW is zero (step S221D), it is determined that the invalidity flag non_SW is not zero, so that the activation of the process associated with the operation switch is avoided. In addition, the invalidity flag non_SW is reset to zero (step S225D).

In step S281D, the state flag STATE is increased by 1 and if the state flag STATE is larger than 11b after the increase, the state flag STATE is returned to 00b.

Figure 2B:
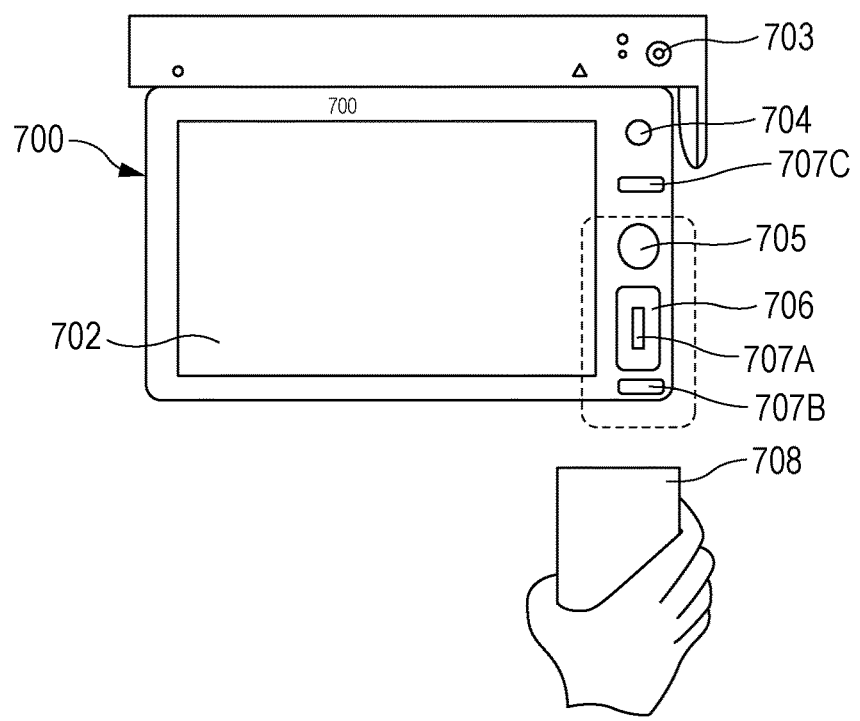
FIG. 2B is a front view illustrating an appearance of another example of the operation panel unit according to the embodiment of the present disclosure.

In the embodiment described above, it is assumed that the operation panel as illustrated in FIG. 2A is used as an operation panel, but the embodiment may be applied to the operation panel as illustrated in FIG. 2B as it is or as modified. For example, at least one of detecting switches 707A, 707B, and 707C is pressed, one of the detecting switches 707A, 707B, and 707C may be handled in the same manner as when the detecting switch 707 illustrated in FIG. 2A is pressed. In addition, for the power saving switch 704, if it is detected that the detecting switch 707C is not pressed even if it is detected that the detecting switch 707A is pressed, it may be handled that no detecting switch is pressed. Further, although not illustrated, a fourth detecting switch is provided between an upper end of the NFC antenna 706 and the home switch 705. For the home switch 705, if the press of the fourth detecting switch 707C is not detected even if it is detected that the detecting switch 707A is pressed, it may be handled that no detecting switch is pressed. In addition, if it is detected that the detecting switch 707A and the detecting switch 707B are pressed, based on a size of the placed device which has a recognized type, it is determined that there is no possibility that the device reaches the home switch 705 in a state in which the device presses the detecting switch 707A and the detecting switch 707B at the same time and it may be handled that no detecting switch is pressed.

Further, the operation switch press erroneous-detection avoidance device described above can be realized by hardware, software, or a combination of the hardware and the software. In addition, an operation switch press erroneous-detection avoidance method performed by the operation switch press erroneous-detection avoidance device described above can be also realized by hardware, software, or a combination of the hardware and the software. Here, being realized by software means that a computer reads a program and executes the program.

The program may be stored by using various types of a non-transitory computer readable medium and may be supplied to the computer. The non-transitory computer readable medium includes various types of a tangible storage medium. An example of the non-transitory computer readable medium includes a magnetic recording medium (for example, flexible disk, magnetic tape, and hard disk drive), a magneto-optical recording medium (for example, magneto-optical disk), a CD-read only memory (ROM), a CD-R, a CD-R/W, and a semiconductor memory (for example, mask ROM, programmable ROM (PROM), erasable PROM (EPROM), flash ROM, and random access memory (RAM)). In addition, the program may be supplied to the computer by using various types of a non-transitory computer readable medium. An example of the non-transitory computer readable medium includes an electrical signal, an optical signal, and an electromagnetic wave. The non-transitory computer readable medium can supply the program to the computer via a wired communication line such as a wire and an optical fiber or a wireless communication line.

Further, in the above description, the case where the mobile terminal approaches the NFC antenna is described as an example for the NFC reader/writer and the mobile terminal to execute the NFC, but the case where the NFC reader/writer and the NFC are performed is limited to the mobile terminal. For example, the mobile terminal may be replaced with a card (IC card or the like) capable of performing NFC.

In addition, the present disclosure can also be applied to a configuration without a combination of the NFC reader/writer and the device (for example, mobile terminal, card, or the like) communicating with the NFC reader/writer. For example, the present disclosure may be applied to the configuration in which an object for performing some functions on the operation switch or a switch provided close to the operation switch approaches the operation switch and apparently presses the operation switch.

In particular, instead of having the function of the NFC, the object may have performance of detecting the object which approaches the switch provided close to the operation switch. For example, as long as the object is an object which includes a detecting target which can be detected by using a sensor (for example, barcode reader, optical sensor, magnetic sensor, electric field sensor, camera, pressure sensor, or the like) provided close to the operation switch and it is possible to recognize that the user accidentally presses the operation switch by the object in the case where the operation switch is apparently pressed, the configuration may be included in the present disclosure.

The present disclosure may include various modifications without departing from the scope or characteristics of the disclosure. Therefore, each of the embodiments described above is merely an example, and is not interpreted limitedly. The scope of the present disclosure is indicated by the scope of the claims and is not limited in the specification. Further, all of variations and modifications within the scope of the claims are within the scope of the present disclosure.

The present disclosure contains subject matter related to that disclosed in Japanese Priority Patent Application JP 2017-193221 filed in the Japan Patent Office on Oct. 3, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

INDUSTRIAL APPLICABILITY

The present disclosure may be used for avoiding operation switch press erroneous-detection.

What is claimed is:

1. An operation switch press erroneous-detection avoidance device that, if an operation on an operation switch is performed by an approaching object to the operation switch, in a case where an operation on the operation switch is detected during a period when an event which occurs in association with the operation on the operation switch occurs, prohibits a process associated with the operation switch from being activated, wherein
the operation on the operation switch is detected by release of the press of the switch.

2. The operation switch press erroneous-detection avoidance device according to claim 1,
wherein, in a case where the operation on the operation switch is detected until a predetermined period elapses after the period when the event occurs, the process associated with the operation switch is prohibited from being activated.

3. The operation switch press erroneous-detection avoidance device according to claim 1,
wherein the event is that the approaching object is detected by a detecting switch disposed in a vicinity of the operation switch.

4. The operation switch press erroneous-detection avoidance device according to claim 1,
wherein the event is that the approaching object is detected by a detecting switch disposed in a vicinity of the operation switch and performs a predetermined operation in the vicinity of the operation switch.

5. An operation panel comprising the operation switch press erroneous-detection avoidance device according to claim 1.

6. A multifunctional machine comprising the operation switch press erroneous-detection avoidance device according to claim 1.

7. A non-transitory computer readable medium storing an operation switch press erroneous-detection avoidance program causing a computer to function as the operation switch press erroneous-detection avoidance device according to claim 1.

8. The operation switch press erroneous-detection avoidance device according to claim 1,
wherein the event is that the approaching object is detected by a detecting switch disposed in a vicinity of the operation switch, and
the detection switch detects inputs to the operation switch using a same predetermined method as the operation switch.

9. The operation switch press erroneous-detection avoidance device according to claim 8, wherein the predetermined method is based on detecting a capacitance change.

10. An operation switch press erroneous-detection avoidance method comprising, if an operation on an operation switch is performed by an approaching object to the operation switch, in a case where operation on the operation switch is detected during a period when an event which occurs in association with the operation on the operation switch occurs, prohibiting a process associated with the operation switch from being activated, wherein
the operation on the operation switch is detected by release of the press of the switch.

* * * * *